(12) United States Patent
Lee et al.

(10) Patent No.: US 11,304,178 B2
(45) Date of Patent: Apr. 12, 2022

(54) ELECTRONIC DEVICE FOR RECEIVING PAGING MESSAGE AND OPERATION METHOD THEREOF

(71) Applicant: SAMSUNG ELECTRONICS CO., LTD., Suwon-si (KR)

(72) Inventors: Keonyoung Lee, Suwon-si (KR); Hoyeon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 25 days.

(21) Appl. No.: 17/019,904

(22) Filed: Sep. 14, 2020

(65) Prior Publication Data

US 2021/0099972 A1    Apr. 1, 2021

(30) Foreign Application Priority Data

Sep. 27, 2019    (KR) .................... 10-2019-0119902

(51) Int. Cl.
| | |
|---|---|
| H04W 68/00 | (2009.01) |
| H04W 76/27 | (2018.01) |
| H04W 4/44 | (2018.01) |
| H04W 48/18 | (2009.01) |
| H04W 84/04 | (2009.01) |

(52) U.S. Cl.
CPC ........... H04W 68/005 (2013.01); H04W 4/44 (2018.02); H04W 48/18 (2013.01); H04W 76/27 (2018.02); H04W 84/042 (2013.01)

(58) Field of Classification Search
CPC ..... H04W 68/005; H04W 4/44; H04W 76/27; H04W 48/18; H04W 84/042
See application file for complete search history.

(56) References Cited

U.S. PATENT DOCUMENTS

| | | | |
|---|---|---|---|
| 10,123,365 B2 | 11/2018 | Baek et al. | |
| 10,999,788 B2* | 5/2021 | Casati | H04W 48/18 |
| 2003/0193964 A1 | 10/2003 | Bae et al. | |
| 2011/0194474 A1 | 8/2011 | Kim et al. | |
| 2015/0373644 A1 | 12/2015 | Sathy et al. | |
| 2016/0156746 A1 | 6/2016 | Deng et al. | |
| 2018/0199398 A1* | 7/2018 | Dao | H04L 41/5041 |
| 2018/0249374 A1 | 8/2018 | Park et al. | |
| 2018/0376445 A1 | 12/2018 | Yoon et al. | |

OTHER PUBLICATIONS

International Search Report and Written Opinion dated Nov. 27, 2020 in corresponding International Application No. PCT/KR2020/011745.

\* cited by examiner

*Primary Examiner* — Wayne H Cai

(74) *Attorney, Agent, or Firm* — Nixon & Vanderhye, P.C.

(57) ABSTRACT

Provided are an electronic device and an operation method thereof. The electronic device may include: at least one communication processor configured to perform transmission and/or reception of a packet with a master node via cellular communication; and an application processor, wherein the at least one communication processor may be configured to control the electronic device to: receive, from the master node, a paging message including an indicator indicating a service type for transmission and/or reception of the packet; and activate the application processor based on performing a radio resource connection (RRC) connection with the master node, in response to identifying that the service type included in the indicator corresponds to a predetermined service type.

19 Claims, 12 Drawing Sheets

ELECTRONIC DEVICE FOR RECEIVING PAGING MESSAGE AND OPERATION METHOD THEREOF

CROSS-REFERENCE TO RELATED APPLICATION

This application is based on and claims priority under 35 U.S.C. § 119 to Korean Patent Application No. 10-2019-0119902, filed on Sep. 27, 2019, in the Korean Intellectual Property Office, the disclosure of which is incorporated by reference herein in its entirety.

BACKGROUND

Field

The disclosure relates to an electronic device and an operation method thereof, and for example, to an electronic device that reduces latency using a paging message and an operation method thereof.

Description of Related Art

As various electronic devices such as smart phones, tablet personal computers (PCs), portable multimedia players (PMPs), personal digital assistants (PDAs), laptop PCs, and wearable devices are distributed, various wireless communication technologies used for communication by various electronic devices are being developed.

In order to meet wireless data traffic demands that have increased after $4^{th}$ Generation (4G) communication system commercialization, efforts to develop an improved $4^{th}$ Generation (5G) communication system or a pre-5G communication system have been made. For this reason, the 5G communication system or the pre-5G communication system is called a beyond 4G network communication system or a post LTE system. In order to achieve a high data transmission rate, an implementation of the 5G communication system in an mmWave band (for example, 60 GHz band) is being considered. In the 5G communication system, technologies such as beamforming, massive MIMO, Full Dimensional MIMO (FD-MIMO), array antenna, analog beam-forming, and large scale antenna are being discussed as means to mitigate a propagation path loss in the mm Wave band and increase a propagation transmission distance.

The $5^{th}$ generation (5G) communication may support network slicing that divides a physical network into a plurality of virtual networks, and supports at least one of the plurality of virtual networks based on the characteristics (QoS) of various services.

Also, the 5G communication may provide services which are distinguished based on the purpose of a service. Referring to IMT-2020 that includes implementation of the 5G communication, the 5G communication may support enhanced mobile broadband (eMBB) capable of implementing a maximum data transmission rate of 20 Gbps, ultra-reliable and low latency communication (URLLC) having a maximum latency of 1 ms or less, and massive machine type communication (mMTC) or V2X having a maximum connection density of $10^6/km^2$.

A user equipment (UE) may identify a service that a base station (BS) provides, and may activate a component in order to process the identified service. When the UE receives a communication service reception request (e.g., a mobile terminated call), the UE may have difficulty in identifying a communication service (e.g., eMBB, mMTC, URLLC, or V2X) to be used, until the UE receives user data.

In the case of a communication service (e.g., URLLC or V2X) that minimizes or reduces latency, latency may be increased due to the delay time spent in activating a predetermined component after the UE receives user data.

SUMMARY

Embodiments of the disclosure provide an electronic device and an operation method thereof, that may identify a predetermined service (e.g., URLLC or V2X) is used, using an indicator included in a paging message. Therefore, the electronic device may increase a drive frequency of an application processor in response to identifying that the predetermined service is used, and thus, may reduce the amount of time spent on user data processing, and may reduce latency.

In accordance with an example embodiment of the disclosure, an electronic device may include: at least one communication processor configured to perform transmission and/or reception of a packet with a master node via cellular communication; and an application processor, wherein the at least one communication processor is configured to control the electronic device to: receive, from the master node, a paging message including an indicator indicating a service type for transmission and/or reception of the packet; and activate the application processor based on performing radio resource connection (RRC) connection with the master node, in response to identifying that the service type included in the indicator corresponds to a predetermined service type.

In accordance with an example embodiment of the disclosure, a method of operating an electronic device may include: receiving, by at least one communication processor, a paging message including an indicator indicating a service type for transmission and/or reception of a packet, from a master node configured to perform transmission and/or reception of a packet with the electronic device via cellular communication; and activating, by the at least one communication processor, an application processor based on performing radio resource connection (RRC) connection with the master node, in response to identifying that the service type included in the indicator corresponds to a predetermined service type.

An electronic device and an operation method thereof, according to various embodiments, may include an indicator indicating a communication service type in a paging message received based on a communication service connection being requested, to enable the electronic device tp identify a service type to be used, before receiving user data. Therefore, the electronic device can activate an application processor in advance, based on receiving the user data, and thus, may prevent and/or reduce a delay of user data processing which may occur between reception of the user data and the activation of the processor, and may reduce latency.

An electronic device and an operation method thereof, according to various embodiments, may identify that a predetermined service (e.g., URLLC or V2X) is used, using an indicator included in a paging message. Therefore, the electronic device may increase a drive frequency of an application processor in response to identifying that the predetermined service is used, and thus, may reduce the amount of time spent on user data processing, and may reduce latency.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
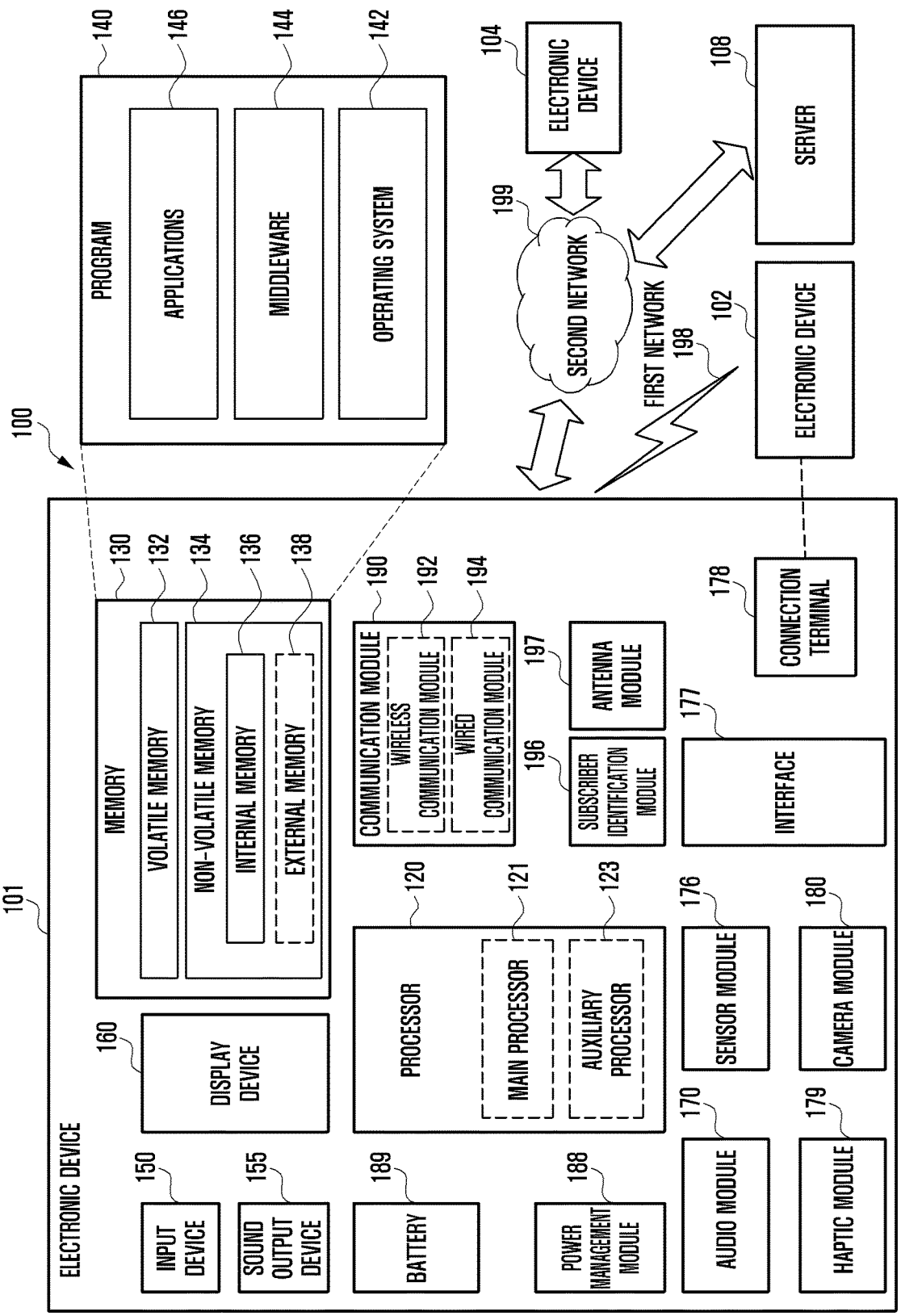
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
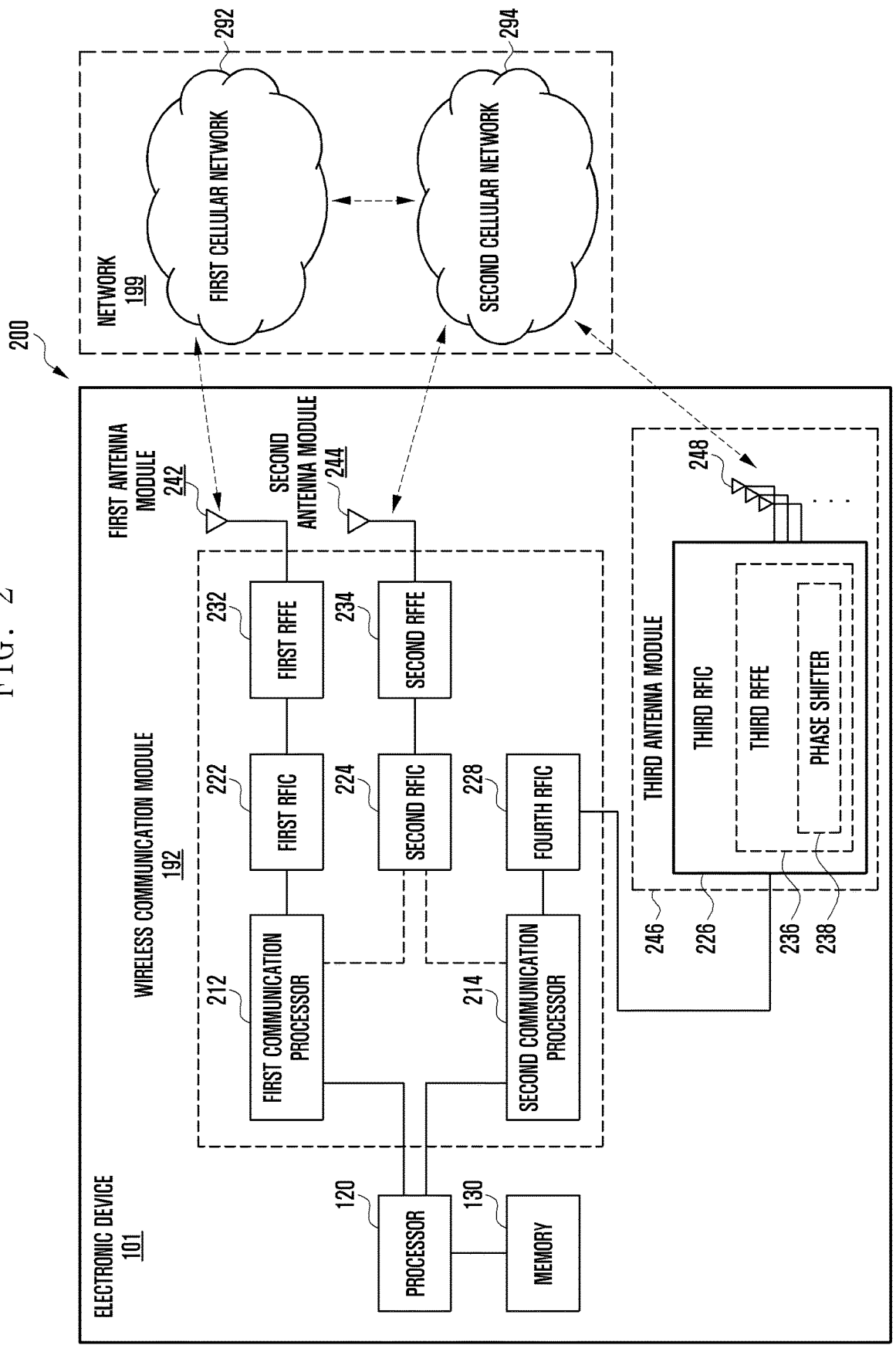
FIG. 2 is a block diagram illustrating an example electronic device supporting legacy network communication and 5G network communication according to various embodiments.

FIG. 2 is a block diagram 200 illustrating an example electronic device 101 supporting legacy network communication and 5G network communication according to various embodiments. Referring to FIG. 2, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include the processor 120 and the memory 130. The network 199 may include a first network 292 and a second network 294. According to another embodiment, the electronic device 101 may further include at least one component among the components illustrated in FIG. 1, and the network 199 may further include at least one other network. According to an embodiment, the first communication processor 212, the second communication processor 214, the first RFIC 222, the second RFIC 224, the fourth RFIC 228, the first RFFE 232, and the second RFFE 234 may be included as at least a part of the wireless communication module 192. According to another embodiment, the fourth RFIC 228 may be omitted or may be included as a part of the third RFIC 226.

The first communication processor 212 may establish a communication channel of a band to be used for wireless communication with the first network 292, and may support legacy network communication via the established communication channel. According to certain embodiments, the first network may be a legacy network including 2G, 3G, 4G, or long term evolution (LTE) network. The second communication processor 214 may establish a communication channel corresponding to a designated band (e.g., approximately 6 GHz to 60 GHz) among bands to be used for wireless communication with the second network 294, and may support 5G network communication via the established channel. According to certain embodiments, the second network 294 may be a 5G network defined in 3GPP. Additionally, according to an embodiment, the first communication processor 212 or the second communication processor 214 may establish a communication channel corresponding to another designated band (e.g., lower than 6 GHz) among bands to be used for wireless communication with the second network 294, and may support 5G network communication via the established channel. According to an embodiment, the first communication processor 212 and the second communication processor 214 may be implemented in a single chip or a single package. According to certain embodiments, the first communication processor 212 or the second communication processor 214 may be implemented in a single chip or a single package, together with the processor 120, the sub-processor 123, or the communication module 190.

In the case of transmission, the first RFIC 222 may convert a baseband signal generated by the first communication processor 212 into a radio frequency (RF) signal in a range of approximately 700 MHz to 3 GHz used for the first network 292 (e.g., a legacy network). In the case of reception, an RF signal is obtained from the first network 292 (e.g., a legacy network) via an antenna (e.g., the first antenna module 242), and may be preprocessed via an RFFE (e.g., the first RFFE 232). The first RFIC 222 may convert the preprocessed RF signal to a baseband signal so that the base band signal is processed by the first communication processor 212.

In the case of transmission, the second RFIC 224 may convert a baseband signal generated by the first communication processor 212 or the second communication processor 214 into an RF signal (hereinafter, a 5G Sub6 RF signal) of a Sub6 band (e.g., lower than 6 GHz) used for the second network 294 (e.g., 5G network). In the case of reception, a 5G Sub6 RF signal is obtained from the second network 294 (e.g., a 5G network) via an antenna (e.g., the second antenna module 244), and may preprocessed by an RFFE (e.g., the second RFFE 234). The second RFIC 224 may convert the preprocessed 5G Sub6 RF signal into a baseband signal so that the baseband signal is processed by a corresponding communication processor from among the first communication processor 212 or the second communication processor 214.

The third RFIC 226 may convert a baseband signal generated by the second communication processor 214 into an RF signal (hereinafter, a 5G Above6 RF signal) of a 5G Above6 band (e.g., approximately 6 GHz to 60 GHz) to be used for the second network 294 (e.g., 5G network). In the case of reception, a 5G Above6 RF signal is obtained from the second network 294 (e.g., a 5G network) via an antenna (e.g., the antenna 248), and may be preprocessed by the third RFFE 236. The third RFIC 226 may convert the preprocessed 5G Above6 RF signal to a baseband signal so that the base band signal is processed by the second communication processor 214. According to an embodiment, the third RFFE 236 may be implemented as a part of the third RFIC 226.

According to an embodiment, the electronic device 101 may include the fourth RFIC 228, separately from or as a part of the third RFIC 226. In this instance, the fourth RFIC 228 may convert a baseband signal generated by the second communication processor 214 into an RF signal (hereinafter, an IF signal) in an intermediate frequency band (e.g., approximately 9 GHz to 11 GHz), and may transfer the IF signal to the third RFIC 226. The third RFIC 226 may convert the IF signal to a 5G Above6 RF signal. In the case of reception, a 5G Above6 RF signal is received from the second network 294 (e.g., a 5G network) via an antenna (e.g., the antenna 248), and may be converted into an IF signal by the third RFFE 226. The fourth RFIC 228 may convert the IF signal to a baseband signal so that the base band signal is processed by the second communication processor 214.

According to an embodiment, the first RFIC 222 and the second RFIC 224 may be implemented as a single chip or at least a part of the single package. According to an embodiment, the first RFFE 232 and the second RFFE 234 may be implemented as a single chip or at least a part of the single package. According to an embodiment, at least one antenna module of the first antenna module 242 or the second antenna module 244 may be omitted, or may be combined with another antenna module so as to process RF signals in a plurality of bands.

According to an embodiment, the third RFIC 226 and the antenna 248 may be disposed in the same substrate, and may form the third antenna module 246. For example, the wireless communication module 192 or the processor 120 may be disposed in a first substrate (e.g., main PCB). In this instance, the third RFIC 226 is disposed in a part (e.g., a lower part) of the second substrate (e.g., a sub PCB) separate from the first substrate and the antenna 248 is disposed on another part (e.g., an upper part), so that the third antenna module 246 is formed. By disposing the third RFIC 226 and the antenna 248 in the same substrate, the length of a transmission line therebetween may be reduced. For example, this may reduce a loss (e.g., attenuation) of a signal in a high-frequency band (e.g., approximate 6 GHz to 60 GHz) used for 5G network communication, the loss being caused by a transmission line. Accordingly, the electronic device 101 may improve the quality or speed of communication with the second network 294 (e.g., 5G network).

According to an embodiment, the antenna 248 may be implemented as an antenna array including a plurality of antenna elements which may be used for beamforming. In this instance, the third RFIC 226 may be, for example, a part of the third RFFE 236, and may include a plurality of phase shifters 238 corresponding to a plurality of antenna elements. In the case of transmission, each of the plurality of phase shifters 238 may shift the phase of a 5G Above6RF signal to be transmitted to the outside of the electronic device 101 (e.g., a base station of a 5G network) via a corresponding antenna element. In the case of reception, each of the plurality of phase shifters 238 may shift the phase of the 5G Above6 RF signal received from the outside via a corresponding antenna element into the same or substantially the same phase. This may enable transmission and/or reception via beamforming between the electronic device 101 and the outside.

The second network 294 (e.g., 5G network) may operate independently (e.g., Stand-Along (SA)) from the first network 292 (e.g., a legacy network), or may operate by being connected thereto (e.g., Non-Stand Alone (NSA)). For example, in the 5G network, only an access network (e.g., 5G radio access network (RAN) or next generation RAN (NG RAN)) may exist, and a core network (e.g., next generation core (NGC)) may not exist. In this instance, the electronic device 101 may access an access network of the 5G network, and may access an external network (e.g., the Internet) under the control of the core network (e.g., an evolved packed core (EPC)) of the legacy network. Protocol information (e.g., LTE protocol information) for communication with the legacy network or protocol information (e.g., New Radio (NR) protocol information) for communication with the 5G network may be stored in the memory 230, and may be accessed by another component (e.g., the processor 120, the first communication processor 212, or the second communication processor 214).

Figure 3:
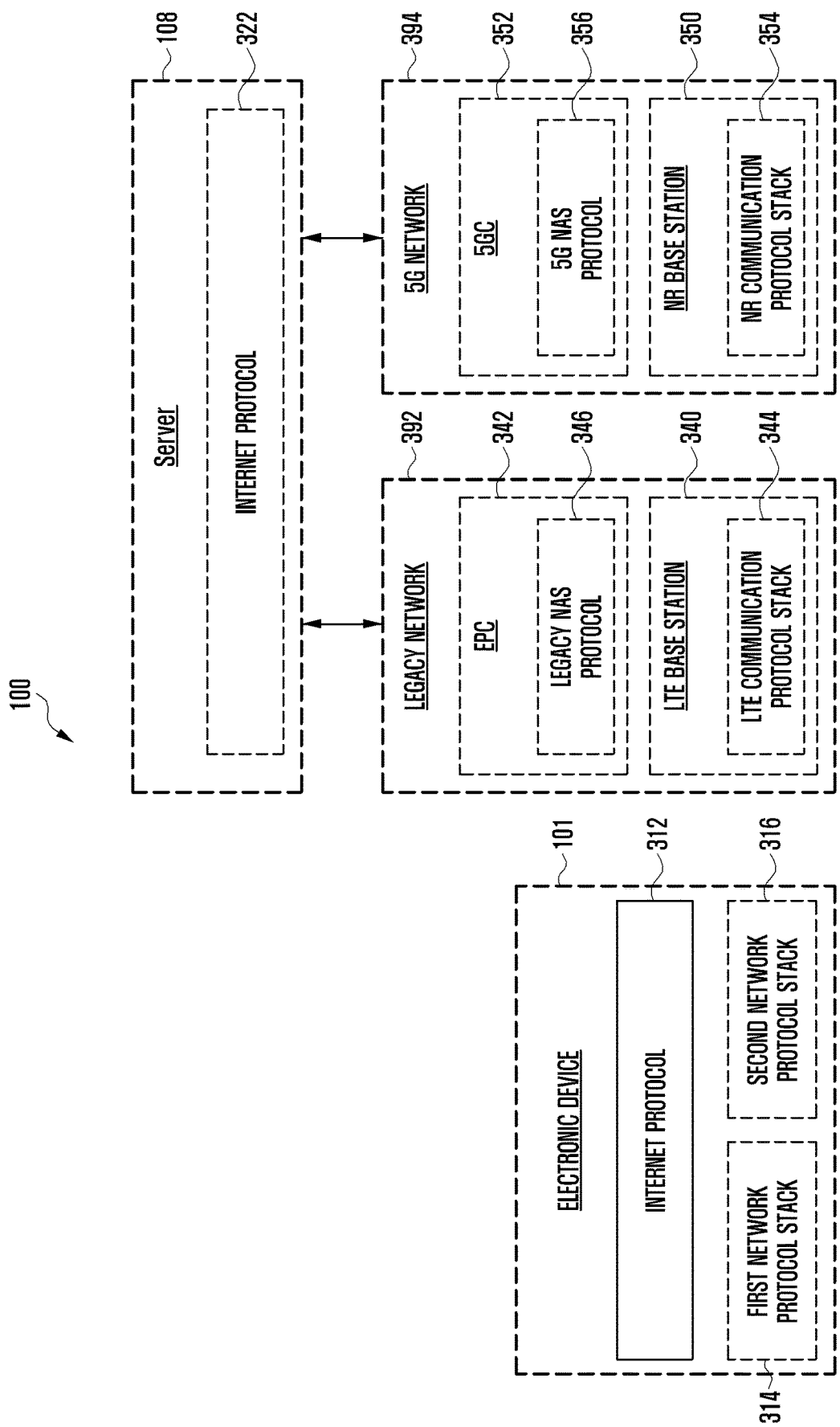
FIG. 3 is a diagram illustrating an example protocol stack structure of a network in legacy network communication and/or 5G network communication according to various embodiments.

FIG. 3 is a diagram illustrating an example protocol stack structure of the network 100 of legacy communication and/or 5G communication according to various embodiments.

Referring to FIG. 3, the network 100 according to an illustrated embodiment may include the electronic device 101, a legacy network 392, a 5G network 394, and the server 108.

The electronic device 101 may include an Internet protocol 312, a first communication protocol stack 314, and a second communication protocol stack 316. The electronic device 101 may communicate with the server 108 through the legacy network 392 and/or the 5G network 394.

According to an embodiment, the electronic device 101 may perform Internet communication associated with the server 108 through the Internet protocol 312 (for example, a TCP, a UDP, or an IP). The Internet protocol 312 may be executed by, for example, a main processor (for example, the main processor 121 of FIG. 1) included in the electronic device 101.

According to another embodiment, the electronic device 101 may perform wireless communication with the legacy network 392 through the first communication protocol stack 314. According to another embodiment, the electronic device 101 may perform wireless communication with the 5G network 394 through the second communication protocol stack 316. The first communication protocol stack 314 and the second communication protocol stack 316 may be executed by, for example, one or more communication processors (for example, the wireless communication module 192 of FIG. 1) included in the electronic device 101.

The server 108 may include an Internet protocol 322. The server 108 may transmit and receive data related to the Internet protocol 322 to and from the electronic device 101 through the legacy network 392 and/or the 5G network 394. According to an embodiment, the server 108 may include a cloud computing server existing outside the legacy network 392 or the 5G network 394. According to another embodiment, the server 108 may include an edge computing server (or a mobile edge computing (MEC) server) located inside at least one of the legacy network or the 5G network 394.

The legacy network 392 may include an LTE eNode B (eNB) 340 and an EPC 342. The LTE eNB 340 may include an LTE communication protocol stack 344. The EPC 342 may include a legacy NAS protocol 346. The legacy network 392 may perform LTE wireless communication with the electronic device 101 through the LTE communication protocol stack 344 and the legacy NAS protocol 346.

The 5G network 394 may include an NR gNB 350 and a 5GC 352. The NR gNB 350 may include an NR communication protocol stack 354. The 5GC 352 may include a 5G NAS protocol 356. The 5G network 394 may perform NR wireless communication with the electronic device 101 through the NR communication protocol stack 354 and the 5G NAS protocol 356.

According to an embodiment, the first communication protocol stack 314, the second communication protocol stack 316, the LTE communication protocol stack 344, and the NR communication protocol stack 354 may include a control plane protocol for transmitting and receiving a control message and a user plane protocol for transmitting and receiving user data. The control message may include a message related to at least one of, for example, security control, bearer setup, authentication, registration, or mobility management. The user data may include, for example, the remaining data except other than the control message.

According to an embodiment, the control plane protocol and the user plane protocol may include a physical (PHY) layer, a medium access control (MAC) layer, a radio link control (RLC) layer, or a packet data convergence protocol (PDCP) layer. The PHY layer may channel-code and modulate data received from, for example, a higher layer (for example, the MAC layer), transmit the data through a radio channel, demodulate and decode the data received through the radio channel, and transmit the data to the higher layer.

The PHY layer included in the second communication protocol stack 316 and the NR communication protocol stack 354 may further perform an operation related to beamforming. The MAC layer may logically/physically map, for example, data to a radio channel for transmitting and receiving the data and perform a hybrid automatic repeat request (HARD) for error correction. The RLC layer may perform, for example, data concatenation, segmentation, or reassembly, and data sequence identification, reordering, or duplication detection. The PDCP layer may perform an operation related to, for example, ciphering of a control message and user data and data integrity. The second communication protocol stack 316 and the NR communication protocol stack 354 may further include a service data adaptation protocol (SDAP). The SDAP may manage allocation of radio bearers on the basis of quality of service (QoS) of user data.

According to certain embodiments, the control plane protocol may include a radio resource control (RRC) layer and a non-access stratum (NAS) layer. The RRC layer may process control, for example, data related to radio bearer setup, paging, or mobility management. The NAS may process, for example, a control message related to authentication, registration, or mobility management.

Figure 4A:
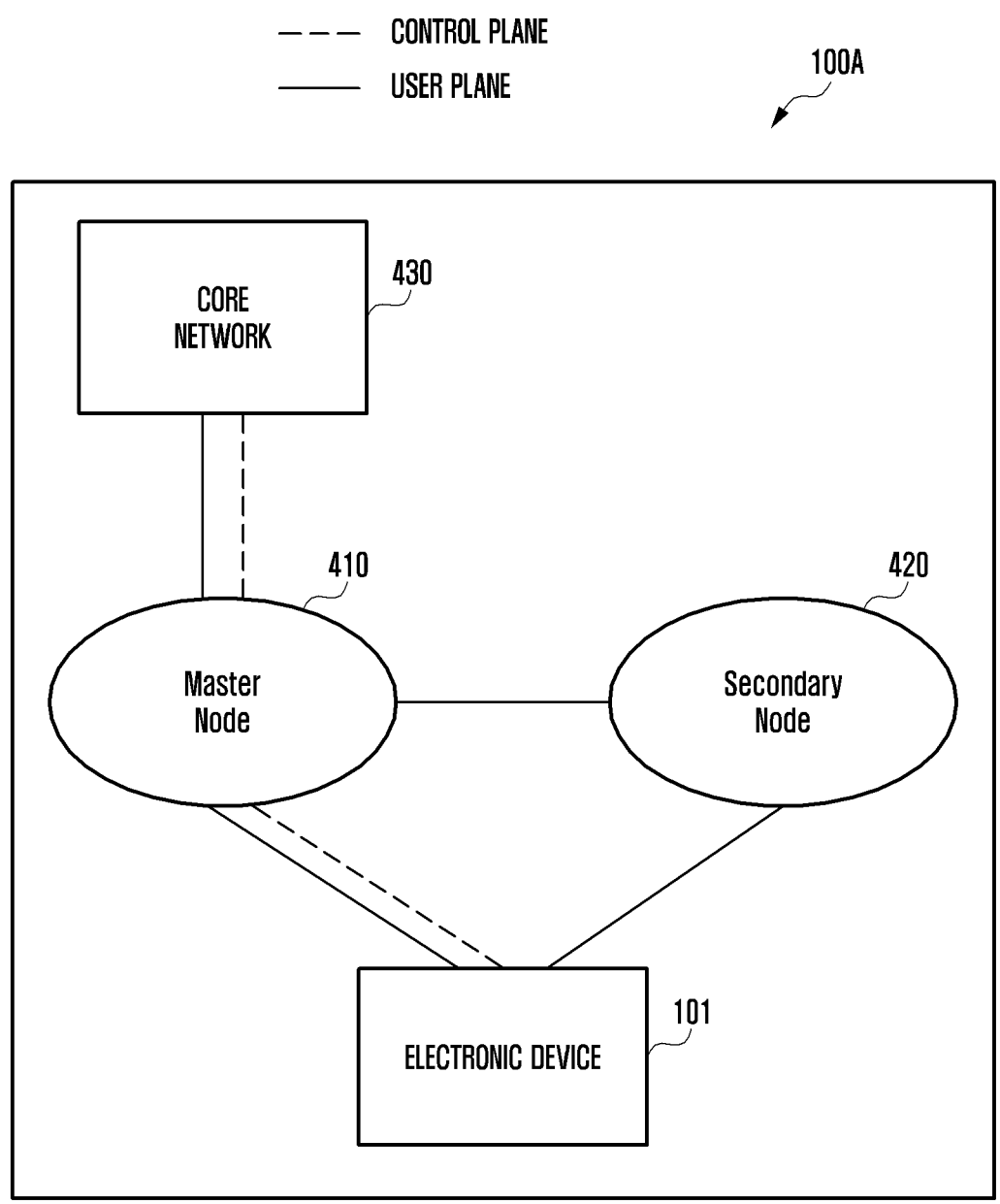
FIG. 4A is a diagram illustrating an example wireless communication system providing a network of legacy communication and 5G communication according to various embodiments.
Figure 4B:
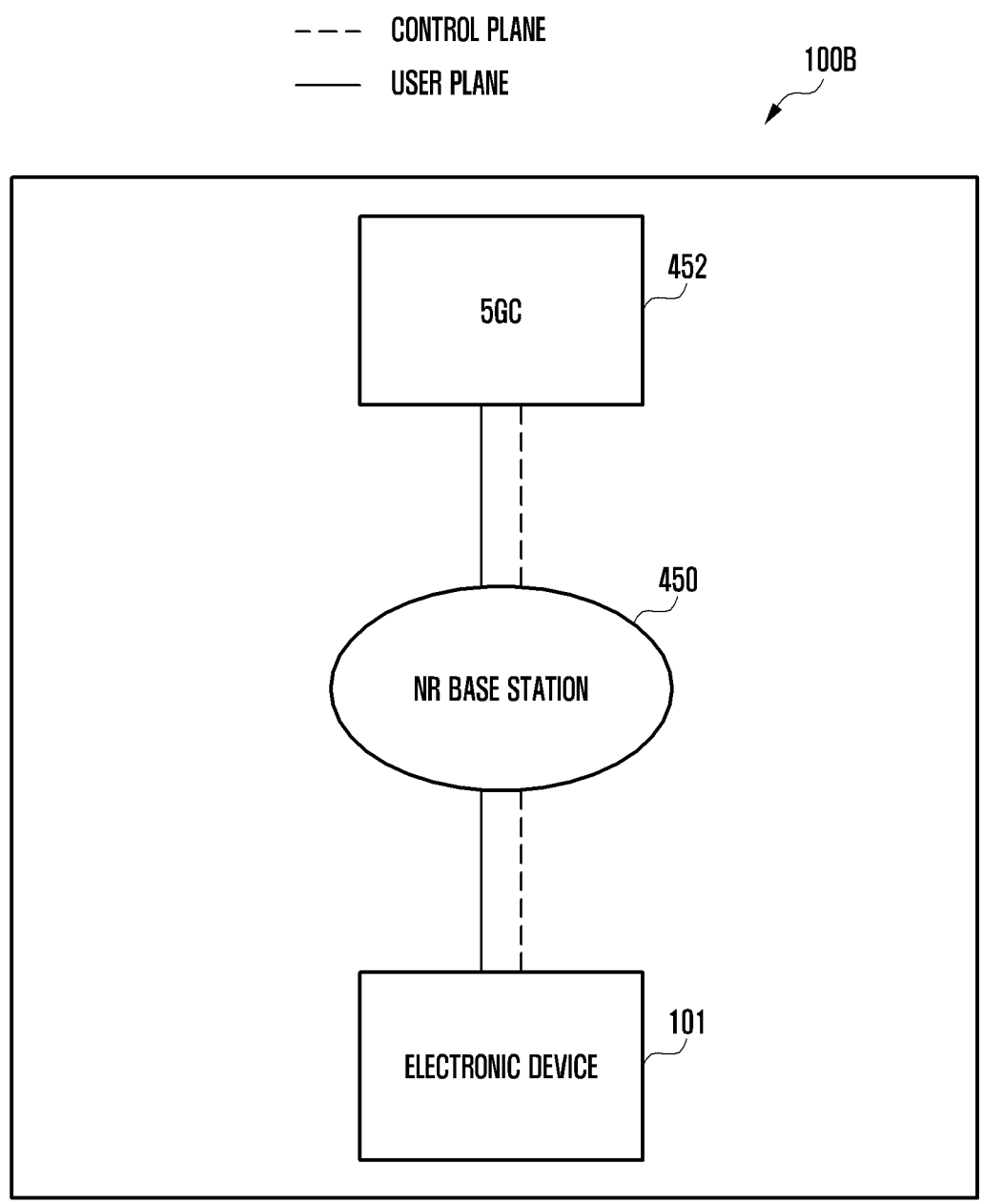
FIG. 4B is a diagram illustrating an example wireless communication system providing a network of legacy communication and 5G communication according to various embodiments.
Figure 4C:
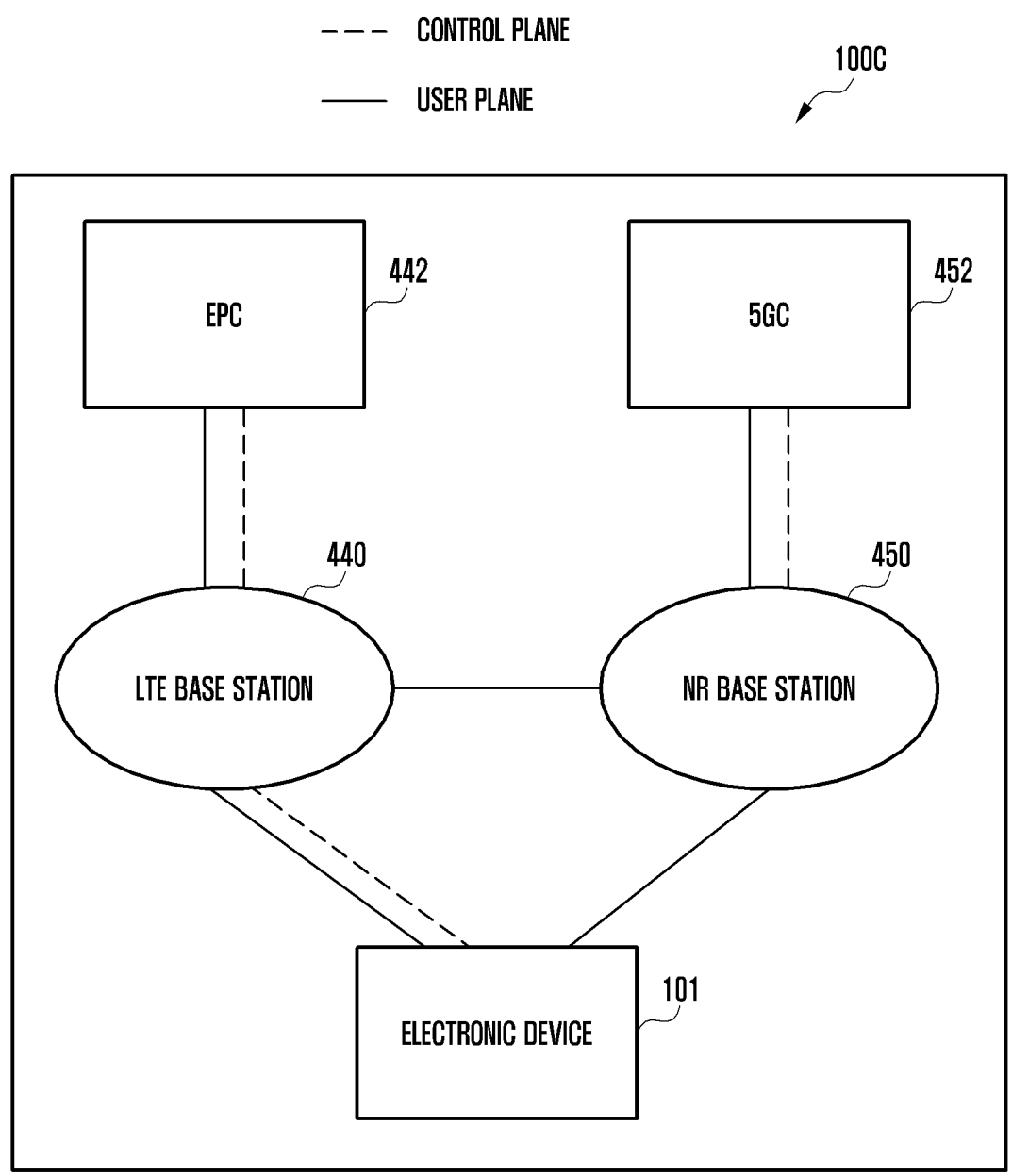
FIG. 4C is a diagram illustrating an example wireless communication system providing a network of legacy communication and 5G communication according to various embodiments.

FIG. 4A is a diagram illustrating an example wireless communication system providing a network of legacy communication and/or 5G communication according to various embodiments, FIG. 4B is a diagram illustrating an example wireless communication system providing a network of legacy communication and/or 5G communication according to various embodiments, and FIG. 4C is a diagram illustrating an example wireless communication system providing a network of legacy communication and/or 5G communication according to various embodiments. Referring to FIGS. 4A, 4B and 4C (which may be referred to hereinafter as FIGS. 4A to 4C for convenience), network environments 100A, 100B and 100C may include at least one of a legacy network and a 5G network. The legacy network may include, for example, a 4G or LTE eNB 450 (for example, an eNodeB (eNB)) of the 3GPP standard supporting radio access with the electronic device 101 and an evolved packet core (EPC) 451 for managing 4G communication. The 5G network may include, for example, a new radio (NR) gNB 450 (for example, a gNodeB (gNB)) supporting radio access with the electronic device 101 and a 5$^{th}$ generation core (5GC) 452 for managing 5G communication of the electronic device 101.

According to certain embodiments, the electronic device 101 may transmit and receive a control message and user data through legacy communication and/or 5G communication. The control message may include, for example, a control message related to at least one of security control of the electronic device 101, bearer setup, authentication, registration, or mobility management. The user data may be, for example, user data other than a control message transmitted and received between the electronic device 101 and a core network 430 (for example, the EPC 442).

Referring to FIG. 4A, the electronic device 101 according to an embodiment may transmit and receive at least one of a control message or user data to and from at least some of the 5G network (for example, the NR gNB 450 and the 5GC 452) using at least some of the legacy network (for example, the LTE eNB 440 and the EPC 442).

According to certain embodiments, the network environment 100A may include a network environment for providing wireless communication dual connectivity (multi-radio access technology (RAT) dual connectivity (MR-DC)) to the LTE eNB 440 and the NR gNB 450 and transmitting and receiving a control message to and from the electronic device 101 through one core network 430 of the EPC 442 or the 5GC 452.

According to certain embodiments, one of the MR-DC environment, the LTE eNB 440 or the NR gNB 450 may operate as a master node (MN) 410, and the other may operate as a secondary node (SN) 420. The MN 410 may be connected to the core network 430 and transmit and receive a control message. The MN 410 and the SN 420 may be connected to each other through a network interface and transmit and receive a message related to radio resource (for example, communication channel) management.

According to certain embodiments, the MN 410 may include the LTE eNB 450, the SN 420 may include the NR gNB 450, and the core network 430 may include the EPC 442. For example, a control message may be transmitted and received through the LTE eNB 440 and the EPC 442, and user data may be transmitted and received through the LTE eNB 450 and the NR gNB 450.

Referring to FIG. 4B, according to certain embodiments, the 5G network may independently transmit and receive a control message and user data to and from the electronic device 101.

Referring to FIG. 4C, the legacy network and the 5G network according to certain embodiments may independently provide data transmission and reception. For example, the electronic device 101 and the EPC 442 may transmit and receive a control message and user data through the LTE eNB 450. According to another embodiment, the electronic device 101 and the 5GC 452 may transmit and receive a control message and user data through the NR gNB 450.

According to certain embodiments, the electronic device 101 may be registered in at least one of the EPC 442 or the 5GC 450 and transmit and receive a control message.

According to certain embodiments, the EPC 442 or the 5GC 452 may interwork and manage communication of the electronic device 101. For example, movement information of the electronic device 101 may be transmitted and received through an interface between the EPC 442 and the 5GC 452.

Figure 5:
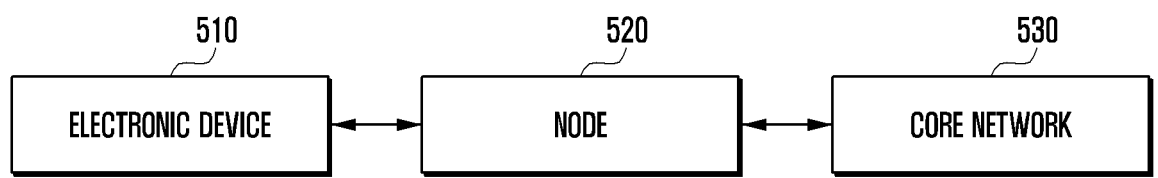
FIG. 5 is a block diagram illustrating an example electronic device, node, and core network according to various embodiments.

FIG. 5 is a block diagram illustrating an example electronic device, node, and core network according to various embodiments.

The electronic device 101 according to various embodiments may perform data transmission and/or reception with various external electronic devices using a node 520 (e.g., the master node 410 of FIG. 4A, the secondary node 420 of FIG. 4A, the NR base station 450 of FIG. 4B, the LTE base station 440 of FIG. 4C, or the NR base station 450 of FIG. 4C) and a core network 530 (e.g., the core network 430 of FIG. 4A, the 5GC 452 of FIG. 4B, or the EPC 442 of FIG. 4C), via first cellular communication or second cellular communication. The electronic device 101 may perform transmission and/or reception of control data and/or user data with the node 520, while performing the first cellular communication and/or the second cellular communication. The first cellular communication may be any one of various cellular communication schemes that the electronic device 101 is capable of supporting. For example, and without limitation, the first cellular communication may include one of the 4$^{th}$ generation (4G) mobile communication schemes (e.g., long-term evolution (LTE), LTE-advanced (LTE-A), LTE-advanced pro (LTE-A pro)), the 5G mobile communication schemes (e.g., 5G on below 6 GHz or 5G on above 6 GHz), or the like, and may be, for example, a communication scheme performed on the first cellular network of FIG. 2. The second cellular communication may include, for example, any one of various cellular communication schemes that the electronic device 101 is capable of supporting, and may be, for example, a communication scheme performed on the second cellular network 294 of FIG. 2. For example, the second cellular communication may be one of the 4G mobile communication schemes (e.g., long-term evolution (LTE), LTE-advanced (LTE-A), LTE-advanced pro (LTE-A pro)) or the 5G mobile communication schemes (e.g., 5G on below 6 GHz or 5G on above 6 GHz).

According to various embodiments, the node 520 may be connected to the electronic device 101 in a wireless manner, and may be connected to the core network 530 in a wired or wireless manner, such that a path for data transmission and/or reception is established between the electronic device 101 and the core network 530. The node 520 may transmit control data and/or user data, which is transmitted from the core network 520, to the electronic device 101. The node 520 may transmit control data or user data, which is transmitted from the electronic device 101, to the core network 530. The control data may be data for controlling various operations performed based on the first cellular communication or the second cellular communication of the electronic device 101. The user data may include, for example, IP data or non-IP data transmitted via the first cellular communication or the second cellular communication of the electronic device 101.

According to various embodiments, the core network 530 may perform various functions (e.g., call connection, IP data processing, authentication of the electronic device 101, processing of payment for a cellular communication service that the electronic device 101 uses, mobility management associated with the electronic device 101, or connecting the electronic device 101 to an external network) using cellular communication that the electronic device 101 uses. The core network 530 may be referred to as an evolved packet core (EPC) in the first cellular communication including the 4G mobile communication scheme, or may be referred to as a 5$^{th}$ generation core (5GC) in the second cellular communication including the 5G mobile communication.

According to various embodiments, the core network 530 that supports the 5G mobile communication may be capable of supporting more and various functions (e.g., network slicing or edge computing) compared to a core network that supports the 4G mobile communication. Network slicing may refer, for example, to a technology that divides a physical network into a plurality of virtual networks, and variously provides a virtual network depending on the characteristic (e.g., QoS) of a service. In the case in which the core network 530 supports network slicing, the core network 530 may provide a virtual network resource and service which has a quality corresponding to a service that the electronic device 101 uses. For example, the core network 530 may provide a network resource and service which is implemented to have low latency, in response to identifying that the service that the electronic device uses is a service having low latency (e.g., vehicle to everything (V2X) or ultra-reliable and low latency communication (URLLC)). As another example, the core network 530 may provide a network resource and service implemented to achieve a fast transmission time, in response to identifying that the service that the electronic device 101 uses is a service that requires a fast transmission time (e.g., enhanced mobile broadband (eMBB)). eMBB may allocate resource blocks, such that a wide bandwidth is provided, in order to reduce a data transmission time. Each of the various services that may be implemented via network slicing, may be defined as a network slice instance.

According to various embodiments, ultra-reliable and low latency communication (URLLC) may refer, for example, to communication that has a significantly high probability of data transmission and/or reception (high reliability) and a significantly low latency (low latency). In order to implement URLLC, the size of a preamble included in data may be reduced in order to reduce the size of a transmitted data packet, or a separate component (e.g., edge computing) for reducing a data transmission distance may be added.

According to a comparative example used for example non-limiting comparison with the embodiment of the disclosure, in the case in which the electronic device 101 receives a communication service reception request (e.g., a mobile terminated call), the electronic device 101 may have difficulty in identifying a communication service to be used (e.g., eMBB, massive machine type communication (mMTC), URLLC, or V2X), until user data is received. After user data is received, the electronic device 101 may identify that a predetermined communication service is to be used, based on the received user data. The electronic device 101 may control various components (e.g., at least one of the processor 120 of FIG. 1, a camera module (e.g., the camera module 180 of FIG. 1)) or a display (e.g., the display 160 of FIG. 1)) for implementing the predetermined communication service, in response to identifying that the predetermined communication service is used. If the communication service that the electronic device 101 uses is URLLC or V2x that requires ultra-low latency, latency may be increased due to the delay time that the electronic device 101 spends in identifying whether a predetermined communication service is used, activating a predetermined component, and processing user data, after receiving the user data. Hereinafter, an embodiment, that decreases the amount of time spent on identifying whether a predetermined communication service is used, so as to reduce latency will be described in greater detail.

Figure 6:
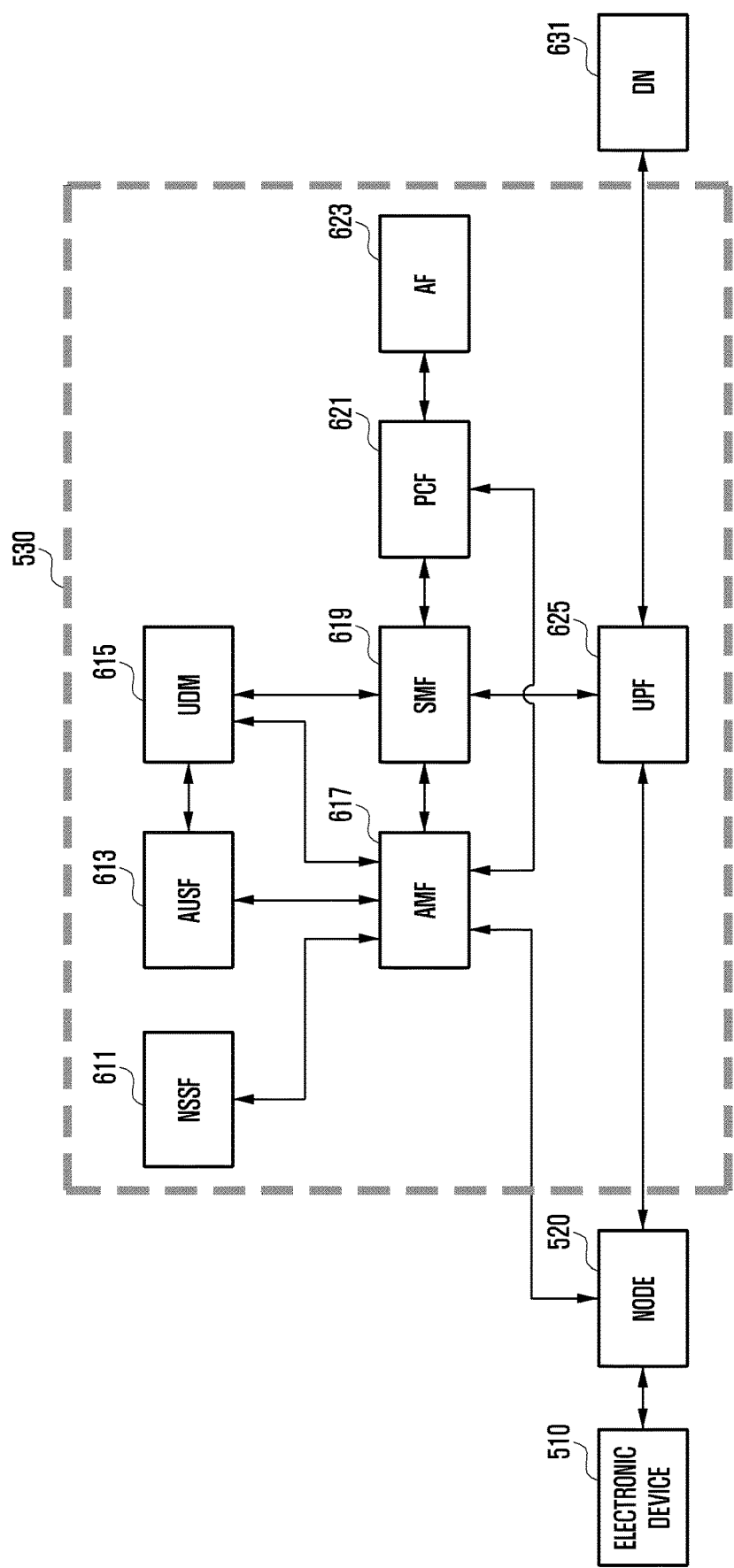
FIG. 6 is a block diagram illustrating an example electronic device, node, and core network according to various embodiments.

FIG. 6 is a block diagram illustrating an example electronic device, node, and core network according to various embodiments.

Referring to FIG. 6, a core network according to various embodiments (e.g., the core network 530 of FIG. 5) may include various components which are logically implemented. The various logically implemented components may be distinguished based on their functions, and may perform different functions, respectively.

According to various embodiments, the core network 530 may include a network slice selection function (NSSF) 611. The NSSF 611 may select one of various network slice instances provided by the core network 530. The NSSF 611 may select one of the various network slice instances based on network slice selection assistance information (NSSAI) transmitted from the electronic device 510, when the electronic device 510 transmits a registration request or a call connection request (e.g., a mobile originated call).

According to various embodiments, the NSSAI may include information needed for selecting one of the plurality of network slice instances. Referring to TS 23.501 of 3GPP Release 15, the NSSAI may include slice and service type information (slice/service type (SST)) which includes an indicator indicating a service type, a slice differentiator (SD) used for distinguishing services having the same service type, SST information of a home public land mobile network (HPLMN) (mapped HPLMN SST) that the core network 530 provides, and an SD (mapped HPLMN SD) used for distinguishing services which have the same SST of the HPLMN provided by the core network 530. The slice and service type may be as illustrated in Table 1 below.

TABLE 1

| Slice/service type information | SST value |
|---|---|
| eMBB | 1 |
| URLLC | 2 |
| mMTC | 3 |
| V2X | 4 |

According to various embodiments, the NSSF 611 may identify an SST and/or SD value included in NSSAI transmitted from the electronic device 510, and may determine a network slice instance based on the SST and/or SD value.

An embodiment in which the electronic device 510 receives a call connection request (e.g., a mobile terminated call) will be described in greater detail below.

According to various embodiments, the core network 530 may include an authentication server function (AUSF) 613. The AUSF 613 may manage data for authenticating cellular communication provided by the core network 530 of the electronic device 510.

According to various embodiments, the core network 530 may include a user data management function (UDM) 615. The UDM 615 may manage data associated with a subscribed calling plan of the electronic device 510 and policy data.

According to various embodiments, the core network 530 may include an access and mobility management function (AMF) 617. The AMF 617 may perform a procedure of registering the electronic device 101 on a cellular communication network, mobility management associated with the electronic device 510 (e.g., identifying the location of the electronic device 101), and management of a connection between the electronic device 510 and the cellular communication network.

According to various embodiments, the core network 530 may include a session management function (SMF) 619. The SMF 619 may perform session management, which includes session establishment including a procedure for data transmission and/or reception between the electronic device 510 and the core network 530, session modification or release, and allocation of the IP address of the electronic device 101.

According to various embodiments, the core network 530 may include a policy control function (PCF) 621. The PCF 621 may manage the policy of a cellular communication network provided by the core network 530. The PCF 621 may determine a policy associated with session management or mobility management based on information associated with a flow of a packet provided by an application function (AF) 623, and may control the AMF 617 and the SMF 619 so that the AMF 617 and the SMF 619 operate based on the determined session management policy and mobility management policy.

According to various embodiments, the core network 530 may include an application function (AF) 623. The AF 623 may monitor a flow of a packet including user data in order to secure a predetermined quality, and may transmit information associated with the flow of the packet to the PCF 621.

According to various embodiments, the core network 530 may include a user plane function (UPF) 625. The UPF 625 may transmit user data, transmitted from the electronic device 101, to a data network (DN) 631, or may transmit user data, transmitted from the data network 631, to the electronic device 510.

According to various embodiments, the core network 530 may transmit a communication service connection request to the electronic device 510. The core network 530 may transmit a paging message including the communication service connection request to the electronic device 510 using a paging channel. The paging channel may be a channel used for periodically transmitting network-related information to electronic devices connected to the node 520, and may be a channel included in a control plane.

According to various embodiments, the core network 530 may include an indicator indicating a communication service type in the paging message which is transmitted to the electronic device 510. The indicator may include information included in network slice selection assistance information (NASSI). The indicator may include, for example, and without limitation, any one of a network slice service type (SST), a network slice and service type of a HPLMN (mapped HPLN SST) that the core network 530 provides, a slice differentiator (mapped HPLMN SD) used for distinguishing services having the same SST of the home public land mobile network (HPLMN) that the core network 530 provides, or the like. The core network 530 may generate an indicator based on the NASSI received from an external network, and may include the generated indicator in the paging message.

According to various embodiments, the core network 530 may include network slice selection assistance information in the paging message. According to another embodiment, the core network 530 may include only a part (e.g., SST, mapped HPLMN SST, or PDU session ID) of the network slice selection assistance information in the paging message.

According to various embodiments, the core network 530 may include an indicator in a paging message which is transmitted before generating a communication channel for user data transmission and/or reception between the electronic device 510 and the node 520, so that the electronic device 510 may identify whether a predetermined communication service is used, before generating the communication channel for user data transmission and/or reception between the electronic device 510 and the node 520. The electronic device 510 may identify whether the predetermined communication service is used, based on the indicator included in the paging message, may activate a predetermined component (e.g., the processor 120 of FIG. 1) before receiving user data via the communication channel for user data transmission and/or reception, based on identifying that the predetermined communication service (e.g., URLLC or V2X) is used, and may reduce an increase in latency associated with the amount of time spent in activating the predetermined component. According to the comparative example, the electronic device receives user data, identifies whether a predetermined communication service is used based on the user data, and activates a predetermined component (e.g., the processor 120 of FIG. 1). According to the comparative example, time is spent in receiving the user data and activating the predetermined component and thus, latency associated with the amount of time spent in processing the user data may be increased. According to various embodiments, a predetermined component is activated before user data is received, and thus, latency associated with the amount of time spent in processing the user data after reception of the user data may be decreased.

Figure 7:
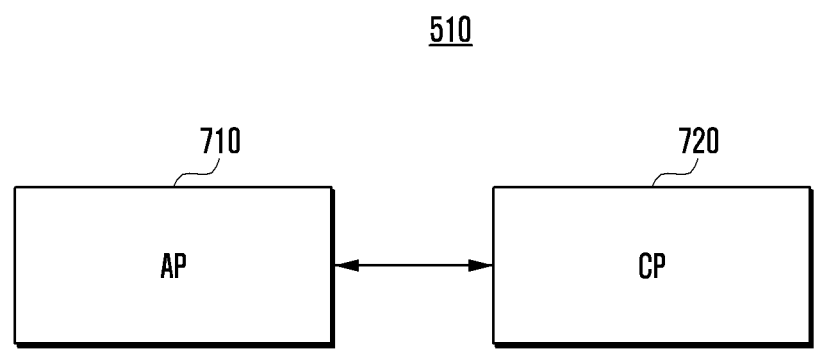
FIG. 7 is a block diagram illustrating an example electronic device according to various embodiments.

FIG. 7 is a block diagram illustrating an example electronic device according to various embodiments of the disclosure.

Referring to FIG. 7, an electronic device (e.g., the electronic device 510 of FIG. 5) according to various embodiments may include an application processor (e.g., including processing circuitry) (AP) 710 (e.g., the processor 120 of FIG. 1) and a communication processor (e.g., including processing circuitry) (CP) 720 (e.g., the communication module 190 of FIG. 1 or the second communication processor 214 of FIG. 2).

According to various embodiments, the application processor 710 may include various processing circuitry and process data that the communication processor 720 receives via first cellular communication and/or second cellular communication. The application processor 710 may enter an idle state in order to reduce the consumption of power stored in a battery (e.g., the battery 189 of FIG. 1). The application processor 710 that operates in the idle state may not perform a separate processing operation, and thus may reduce the amount of power consumed by the application processor 710. The application processor 710 that operates in the idle state may switch to an active state in response to reception of a wake-up signal transmitted from components that are implemented in the electronic device 510 in a software or hardware manner. The application processor 710 that operates in the active state may receive data transmitted from various components, and may process the received data.

According to various embodiments, the communication processor 720 may include various processing circuitry and transmit and/or receive control data or user data via cellular communication (e.g., the first cellular communication or second cellular communication). The communication processor 720 may establish a cellular communication connection with the node 520, based on control data. The communication processor 720 may transmit data, received from the application processor 710 via the established cellular communication, to the node 520, or may transmit data received from the node 520 to the application processor 710. The communication processor 720 may be connected to the application processor 710 using various input/output schemes (e.g., I2C), and may identify whether data that the application processor 710 transmits at predetermined time intervals is present using a timer. The application processor 710 may also identify whether data that the communication processor 720 transmits at predetermined time intervals is present using a timer.

According to various embodiments, the communication processor 720 may receive a paging message that a core network (e.g., the core network 530 of FIG. 5) transmits via the node 520. The paging message is a message including a communication service connection request that is transmitted to the electronic device 510 via a non-access stratum (NAS) layer implemented in a control plane, and may include an indicator indicating a communication service type. The indicator may indicate information included in network slice selection assistance information (NASSI). The indicator may be any one of a network slice service type (SST), a network slice and service type (mapped HPLMN SST) of a HPLMN provided by the core network 530, or a slice differentiator (mapped HPLMN SD) used for distinguishing services having the same SST of the home public land mobile network (HPLMN) provided by the core network 530.

According to various embodiments, a core network (e.g., the core network 530 of FIG. 6) may include network slice selection assistance information in the paging message. According to another embodiment, the core network 530 may include only a part of the network slice selection assistance information (e.g., an SST, mapped HPLMN SST, or a PDU session ID) in the paging message. Table 2 and Table 3 list examples of a paging message including an indicator.

TABLE 2

```
Paging message
Paging ::= SEQUENCE {
    pagingRecordList PagingRecordList OPTIONAL, -- Need N
    lateNonCriticalExtension OCTET STRING OPTIONAL,
    nonCriticalExtension SEQUENCE{ } OPTIONAL
}
PagingRecordList ::= SEQUENCE (SIZE(1..maxNrofPageRec)) OF PagingRecord
PagingRecord ::= SEQUENCE {
    ue-Identity PagingUE-Identity,
    accessType ENUMERATED {non3GPP} OPTIONAL, -- Need N
    s-NSSAI-List SEQUENCE (SIZE (1..maxNrofS-NSSAI)) OF S-NSSAI OPTIONAL,
    ...
}
PagingUE-Identity ::= CHOICE {
    ng-5G-S-TMSI NG-5G-S-TMSI,
    fullI-RNTI I-RNTI-Value,
    ...
}
S-NSSAI
The IE S-NSSAI (Single Network Slice Selection Assistance Information)
identifies a Network Slice end to end and comprises a slice/service type and a
slice differentiator, see TS 23.003 [21].
S-NSSAI information element
-- ASN1START
-- TAG-S-NSSAI-START
S-NSSAI ::= CHOICE{
    sst BIT STRING (SIZE (8)),
    sst-SD BIT STRING (SIZE (32))
}
-- TAG-S-NSSAI-STOP
-- ASN1STOP
```

TABLE 3

```
Paging message
Paging ::= SEQUENCE {
    pagingRecordList PagingRecordList OPTIONAL, -- Need N
    lateNonCriticalExtension OCTET STRING OPTIONAL,
    nonCriticalExtension SEQUENCE{ } OPTIONAL
}
PagingRecordList ::= SEQUENCE (SIZE(1..maxNrofPageRec)) OF PagingRecord
PagingRecord ::= SEQUENCE {
    ue-Identity PagingUE-Identity,
    accessType ENUMERATED {non3GPP} OPTIONAL, -- Need N
    sst BIT STRING (SIZE (8)) OPTIONAL,
    ...
}
PagingUE-Identity ::= CHOICE {
    ng-5G-S-TMSI NG-5G-S-TMSI,
    fullI-RNTI I-RNTI-Value,
    ...
}
```

According to various embodiments, the communication processor 720 may perform various procedures (e.g., RRC connection, measurement of a quality of cellular communication, and RRC connection reconfiguration) for generating a communication channel for data transmission and/or reception via cellular communication with the node 520, in response to reception of a paging message. The communication processor 720 may, for example, identify a service type indicated by an indicator included in the paging message, and may determine whether the identified service type is identical to a predetermined service type. The communication processor 720 may, for example, activate the application processor 710 in response to identifying that the identified service type is identical to the predetermined service type.

According to various embodiments, the service type indicated by the indicator may include, for example, and without limitation, one of eMBB, mMTC, URLLC, V2X, or the like, as illustrated in Table 1, or may be a separate service type. The predetermined type may be one of URLLC or V2X, a service type designated by a manufacturer of the electronic device 700, or a service type designated by an operator of the first cellular communication or an operator of the second cellular communication. For example, in response to identifying that the identified service type is URLLC and the identified service type is identical to the predetermined service type (URLLC), the communication processor 720 may activate the application processor 710.

According to various embodiments, the indicator may include a protocol data unit session identification (PDU session ID). The communication processor 720 may identify the PDU ID, may refer to a PDU ID-service type mapping table stored in a memory (not illustrated) implemented in the communication processor 720, and may identify a service type corresponding to the PDU ID.

According to various embodiments, while performing radio resource connection (RRC) between the node 520 and the communication processor 720, the communication processor 720 may transmit an interrupt signal (or a wakeup signal) to the application processor 710, so as to activate the application processor 710. In response to reception of the interrupt signal, the application processor 710 may be activated in order to process user data.

According to various embodiments, the application processor 710 may maintain a display (e.g., the display device 160 of FIG. 1) in an inactive state, while the communication processor 720 is performing radio resource connection (RRC) with the node 520, and if establishment of the RRC connection is complete or if actual user data for the service is transferred from the communication processor 720 to the application processor 710, the application processor 710 may switch the display 160 to an activate state.

According to various embodiments, the activation completion time of the application processor 710 may be shorter than the amount of time spent in receiving user data after RRC connection is complete. The application processor 710 may be activated completely before user data is received, and thus, may be capable of processing the user data immediately after receiving the user data. Although the above-described embodiment describes activation of the application processor 710, the embodiment of the disclosure may be applied to components (e.g., components operatively connected to the communication processor 720) other than the application processor 710. The electronic device 510 according to various embodiments may activate a predetermined component before user data is received, and thus, latency associated with the amount of time spent in processing the user data after receiving the user data may be decreased. According to the comparative example, latency associated with the amount of time spent in activating an application processor and processing user data after receiving the user data may be, for example, 50 ms to 100 ms. According to an embodiment, the application processor is activated before the user data is received, and thus, a latency of 50 ms to 100 ms may be reduced.

According to various embodiments, in order to further decrease latency, the communication processor 720 may increase a drive frequency of the application processor 710 in response to identifying that the service type included in the indicator is identical (e.g., equivalent, similar, same as, corresponds to etc.) to the predetermined type. In the case of increasing the drive frequency of the application processor 710, a user data processing rate may be improved and thus, latency may be reduced.

According to various embodiments, the communication processor 720 may activate the application processor 710, and may transmit a drive frequency increase request signal to the application processor 710, in response to identifying that the service type included in the indicator is identical to the predetermined type. The application processor 710 may increase a drive frequency in response to reception of the drive frequency increase request signal. The application processor 710 may operate at the increased drive frequency, and process user data, and thus, may increase the user data processing rate and may decrease latency. For example, if the predetermined type is URLLC, the application processor 710 may need to quickly process data received from the communication processor 720 in order to implement low latency. To this end, the application processor 710 may adjust the drive frequency of the application processor 710 based on a reception rate of data received from the node 520 in a PHY layer configured for the communication processor 720. For example, as the data reception rate increases, the application processor 710 may increase the drive frequency of the application processor 710. To this end, the application processor 710 may adjust a drive frequency by referring to a mapping table of a drive frequency and a reception rate.

According to various embodiments, the communication processor 720 may transmit, to the application processor 710, a request signal for decreasing a drive period of a timer used for identifying whether data is transmitted between the application processor 710 and the communication processor 720, in response to identifying that the service type included in the indicator is identical to the predetermined type. The application processor 710 may decrease a period for identifying data transmitted from the communication processor 720, and thus, may increase a user data processing rate and may decrease latency. For example, if the predetermined type is URLLC, the application processor 710 may need to quickly process data received from the communication processor 720 in order to implement low latency. To this end, the application processor 710 may need to quickly receive data from the communication processor 720 in order to quickly process the data received from the communication processor 720. To this end, the application processor 710 may decrease a repetition period for identifying whether the communication processor 720 has received data.

According to various embodiments, the communication processor 720 may maintain the display 160 in the turned-off state, and may prepare a state that enables an ultra-low latency service (e.g., URLLC), in response to identifying that the service type included in the indicator is identical to the predetermined type. According to an embodiment, the operation of preparing the state that enables the ultra-low latency service (e.g., URLLC) may include an operation of adjusting the power state of a peripheral component interconnect express (PCIe) associated with the application processor 710.

According to various embodiments, the operation of preparing the state that enables the low-latency service (e.g., URLLC) may include an operation of pre-loading an application associated with a low-latency service (e.g., URLLC) among applications installed in a terminal, in a memory, and allowing the associated application to be performed immediately after receiving related user data. According to an embodiment, the operation of preparing the state that enables the ultra-low latency service (e.g., URLLC) may include an operation of scheduling the application processor 710 and adjusting a governor in order to perform an application associated with a ultra-low latency service (e.g., URLLC) or restricting at least one other application, excluding the application associated with the low-latency service (e.g., URLLC), from being performed as a background.

Figure 8:
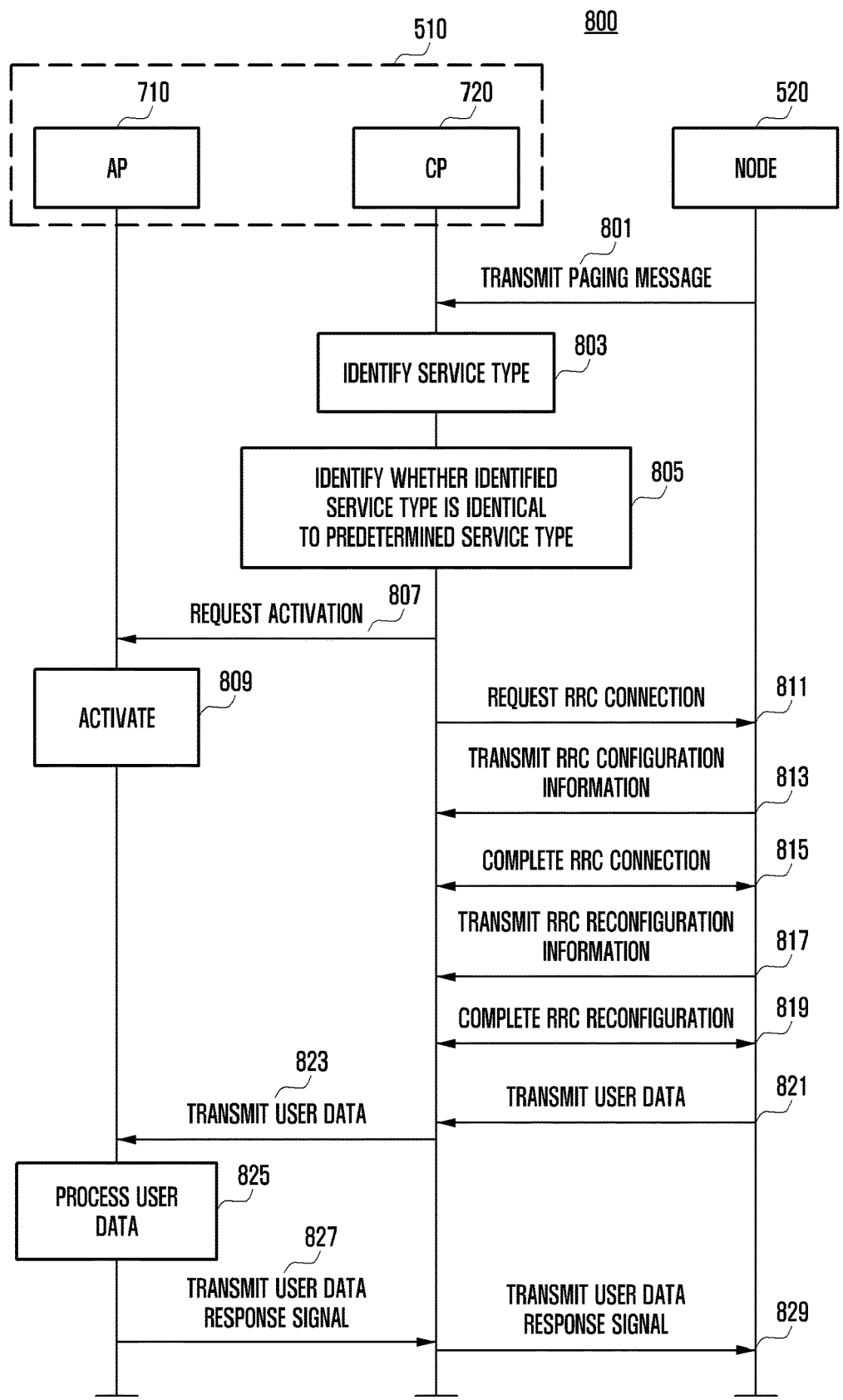
FIG. 8 is a signal flow diagram illustrating an example operation of an electronic device processing a user data packet according to various embodiments.

FIG. 8 is a signal flow diagram illustrating an example operation of an electronic device processing a user data packet according to various embodiments.

According to various embodiments, in operation 801, a node (e.g., the node 520 of FIG. 5) may transmit a paging message to a communication processor (e.g., the communication processor 720 of FIG. 7) of an electronic device (e.g., the electronic device 510 of FIG. 5).

According to various embodiments, a core network (e.g., the core network 530 of FIG. 5) connected to the node 520 may generate a paging message for requesting communication service connection from the electronic device 510, and may transmit the same to the electronic device 510 via the node 520.

According to various embodiments, the core network 530 may include an indicator indicating a communication service type in the paging message transmitted to the electronic device 510. The indicator may indicate information included in network slice selection assistance information (NASSI). The indicator may include, for example, any one of a network slice service type (SST), a network slice and service type (mapped HPLMN SST) of a HPLMN provided by the core network 530, a slice differentiator (mapped HPLMN SD) used for distinguishing services having the same SST of the home public land mobile network (HPLMN) provided by the core network 530, or the like. The core network 530 may generate an indicator based on NASSI received from an external network, and may include the generated indicator in the paging message.

According to various embodiments, the core network 530 may include network slice selection assistance information in the paging message. According to another embodiment, the core network 530 may include only a part of the network slice selection assistance information (e.g., SST, mapped HPLMN SST, or PDU session ID) in the paging message.

According to various embodiments, in operation 803, the communication processor 520 may identify a service type using the indicator included in the paging message.

According to various embodiments, a service type may include, for example, the type of service selected from the various services (e.g., eMBB, URLLC, mMTC, or V2X) which may be implemented as network slices.

According to various embodiments, in operation 805, the communication processor 520 may identify whether the identified service type is identical (e.g., equivalent, similar, same as, corresponds to, etc.) to a predetermined service type.

According to various embodiments, the service type indicated by the indicator may, for example, include one of eMBB, mMTC, URLLC, or V2X as illustrated in Table 1, or may be a separate service type. The predetermined type may be one of URLLC or V2X, a service type designated by a manufacturer of the electronic device 700, or a service type designated by an operator of the first cellular communication or an operator of the second cellular communication. For example, the communication processor 720 may activate the application processor 710 in response to identifying that the identified service type is URLLC and the identified service type is identical to the predetermined service type (URLLC).

According to various embodiments, the indicator may include a protocol data unit session identification (PDU session ID). The communication processor 720 may identify the PDU ID, may refer to a PDU ID-service type mapping table stored in a memory (not illustrated) implemented in the communication processor 720, and may identify a service type corresponding to the PDU ID.

According to various embodiments, in operation 807, the communication processor 520 may transmit an activation request signal associated with the application processor 710 to the application processor 710 in response to identifying that the identified service type is identical to the predetermined type.

According to various embodiments, in operation 809, the application processor 710 may switch to an active state for processing user data in response to receiving the activation request signal.

According to various embodiments, the communication processor 720 may activate the application processor 710, and may transmit a drive frequency increase request signal to the application processor 710 in response to identifying that the service type included in the indicator is identical to the predetermined type. The application processor 710 may increase a drive frequency in response to reception of the drive frequency increase request signal. The application processor 710 may operate at the increased drive frequency, and process user data, and thus, may increase the user data processing rate and may decrease latency.

According to various embodiments, the communication processor 720 may transmit a request signal for decreasing a drive period of a timer used for identifying whether data is transmitted between the application processor 710 and the communication processor 720, to the application processor 710, in response to identifying that the service type included in the indicator is identical to the predetermined type. The application processor 710 may decrease a period for identifying data transmitted from the communication processor 720, and may increase a user data processing rate and decrease latency.

According to various embodiments, the communication processor 720 may control the application processor 710 so as to maintain a display (e.g., the display 160 of FIG. 1) in the turned-off state, and to prepare a state that enables a low-latency service (e.g., URLLC) in response to identifying that the service type included in the indicator is identical to the predetermined type. According to an embodiment, the operation of preparing the state that enables the ultra-low latency service (e.g., URLLC) may include an operation of adjusting the power state of a peripheral component interconnect express (PCIe) associated with the application processor 710. According to various embodiments, the operation of preparing the state that enables the ultra-low latency service (e.g., URLLC) may include an operation of pre-loading an application associated with a low-latency service (e.g., URLLC) among applications installed in a terminal, in a memory, and allowing the associated application to be performed immediately after receiving related user data. According to an embodiment, the operation of preparing the state that enables the ultra-low latency service (e.g., URLLC) may include an operation of scheduling the application processor 710 and adjusting a governor in order to perform an application associated with a ultra-low latency service (e.g., URLLC) or restricting at least one other application, excluding the application associated with the ultra-low latency service (e.g., URLLC), from being performed as a background.

According to various embodiments, in operation 811, the communication processor 720 may transmit a radio resource control (RRC) setup request (e.g., request an RRC connection) to the node 520.

According to various embodiments, in operation 813, the node 520 may transmit RRC configuration information to the communication processor 720.

According to various embodiments, the communication processor 720 may receive the RRC configuration information including control data related to radio bearer configuration, paging, or mobility management from the node 520, and may set up an RRC connection.

According to various embodiments, in operation 815, the communication processor 720 may complete setup of the RRC connection with the node 520 based on the RRC configuration information, and may transmit a signal indicating that RRC connection is completely set up to the node 520.

According to various embodiments, in operation 817, the node 520 may transmit an RRC reconfiguration request signal to the communication processor 720.

According to various embodiments, the RRC connection reconfiguration signal may further include control data related to radio bearer configuration, control data related to measuring a quality of cellular communication and reporting a result, and control data related to paging or mobility management.

According to various embodiments, in operation 819, the communication processor 520 may perform RRC connection reconfiguration and may transmit a signal indicating that the RRC connection reconfiguration is complete to the node 520 in operation 819.

According to various embodiments, the electronic device 510 may maintain a display in the turned-off state, while the communication processor 720 is performing radio resource connection (RRC) with the node 520 (at least some of operations 811 to 819 of FIG. 8), and if establishment of the RRC connection is complete or if actual user data for the service is transferred from the communication processor 720 to the application processor 710, the electronic device 510 may turn on the display.

According to various embodiments, the electronic device may identify a service type using the paging message including the indicator indicating the service type, and may activate the application processor 710, and thus, may reduce latency.

According to various embodiments, in operation 821, the node 520 may transmit user data to the communication processor 720.

According to various embodiments, in operation 823, the communication processor 720 may transmit the user data to the application processor 710.

When comparing various embodiments of the disclosure with the comparative example, the application processor 710 of the disclosure may be activated in advance in operations 807 and 809 before user data is received. In the case of the comparative example, the application processor 710 may be activated after user data is received. According to the comparative example, latency may be increased due to the amount of time spent in activating the application processor 710 after receiving user data. According to various embodiments, the application processor 710 is activated while RRC connection between the communication processor 720 and the node 520 is being performed. Accordingly, time is not spent in activating the application processor 710 after user data is received, and thus, latency may be decreased.

According to various embodiments, in operation 825, the application processor 710 may process the received user data.

According to various embodiments, in operation 827, the application processor 710 may transmit, to the communication processor 720, a user data response signal including a result of processing the received user data.

According to various embodiments, in operation 829, the communication processor 720 may transmit, to the node 520, a user data response signal including a result of processing the user data.

An electronic device according to various example embodiments may include: at least one communication processor configured to control the electronic device to: perform transmission and/or reception of a packet with a master node via cellular communication; and an application processor, wherein the at least one communication processor may be configured to control the electronic device to: receive, from the master node, a paging message including an indicator indicating a service type for transmission and/or reception of the packet; and activate the application processor based on performing a radio resource connection (RRC) connection with the master node, in response to identifying that the service type included in the indicator is corresponds to a predetermined service type.

In the electronic device according to various example embodiments, the indicator may include information included in network slice selection assistance information (NSSAI) included in the paging message.

In the electronic device according to various example embodiments, the indicator may include a value included in a network slice and service type (slice/service type (SST)) provided by a core network connected to the master node.

In the electronic device according to various example embodiments, the indicator may include a value included in a network slice and service type (SST) of a home public land mobile network (HPLMN) provided by a core network connected to the master node.

In the electronic device according to various example embodiments, the at least one communication processor may be configured to: identify a PDU session identification (PDU session ID) included in the paging message; identify a service type corresponding to the PDU session ID; and activate the application processor based on performing a radio resource connection (RRC) connection with the master node, in response to identifying that the service type corresponds to the predetermined service type.

In the electronic device according to various example embodiments, the at least one communication processor may be configured to transmit an interrupt signal to the application processor, to activate the application processor.

In the electronic device according to various example embodiments, the application processor may be configured to: receive the interrupt signal transmitted from the at least one communication processor, based on the at least one communication processor performing the RRC connection with the master node; and be activated in order to process user packet data, in response to reception of the interrupt signal.

In the electronic device according to various example embodiments, the at least one communication processor may be configured to activate the application processor, and to transmit a request signal for increasing a drive frequency of the application processor to the application processor.

In the electronic device according to various example embodiments, the application processor may be configured to: receive, from the at least one communication processor, user packet data transmitted based on the RRC connection with the master node being complete, in a state in which activation of the application processor is complete; and process the user packet data by operating at the increased drive frequency.

In the electronic device according to various example embodiments, the predetermined service type may include ultra-reliable and low latency communication (URLLC) or vehicle to everything (V2X).

Figure 9:
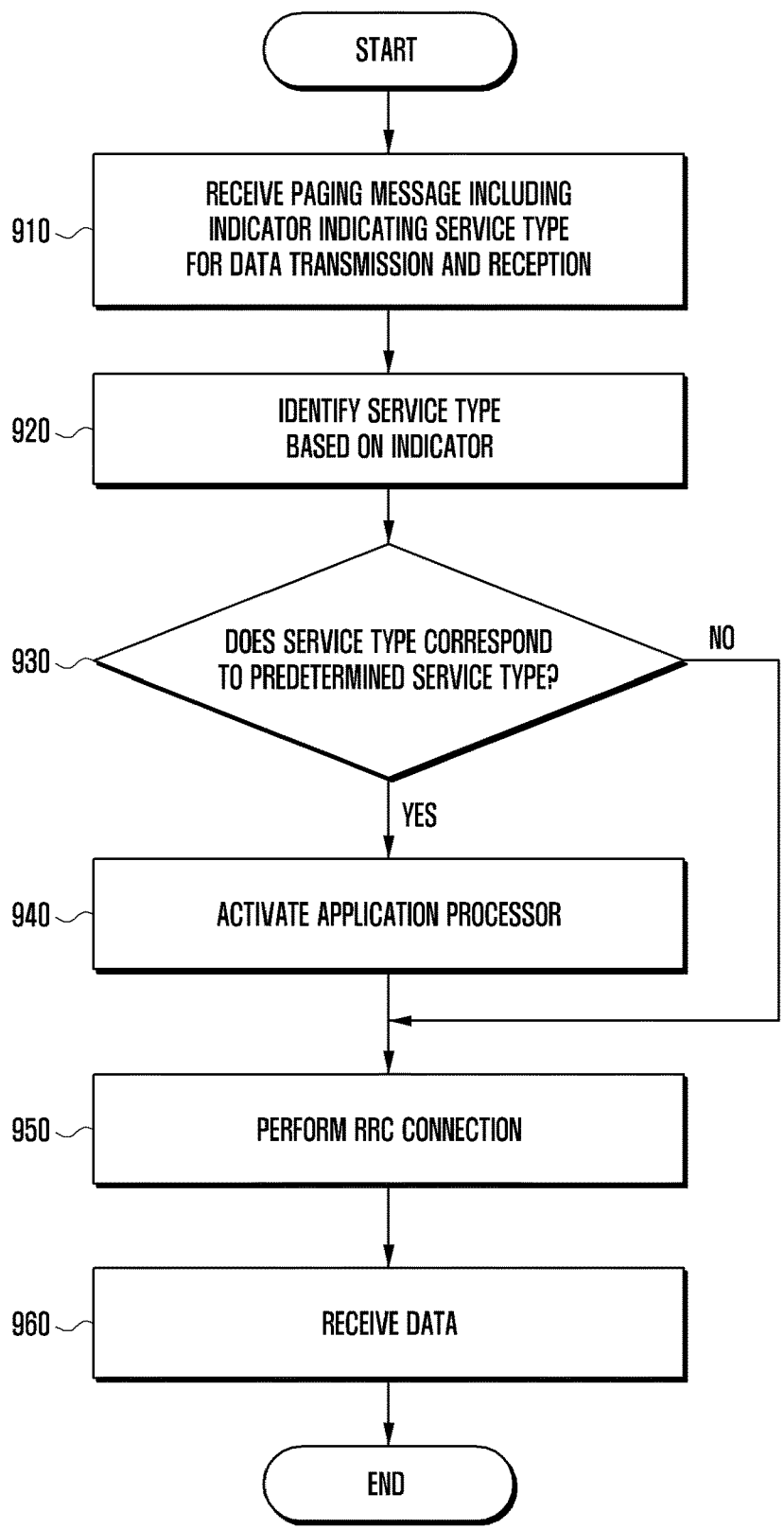
FIG. 9 is a flowchart illustrating an example method of operating an electronic device according to various embodiments.

FIG. 9 is a flowchart illustrating an example method 900 of operating an electronic device according to various embodiments.

According to various embodiments, in operation 910, a communication processor (e.g., the communication processor 720 of FIG. 7) of an electronic device (e.g., the electronic device 510 of FIG. 5) may receive, from a node (e.g., the node 520 of FIG. 5), a paging message including an indicator indicating a service type for data transmission and/or reception.

According to various embodiments, a core network (e.g., the core network 530 of FIG. 5) connected to the node 520 may generate a paging message for requesting communication service connection from the electronic device 510, and may transmit the same to the electronic device 510 via the node 520.

According to various embodiments, the core network 530 may include an indicator indicating a communication service type in the paging message transmitted to the electronic device 510. The indicator may indicate information included in network slice selection assistance information (NASSI). The indicator may include, for example, and without limitation, any one of a network slice service type (SST), a network slice and service type (mapped HPLMN SST) of a HPLMN provided by the core network 530, a slice differentiator (mapped HPLMN SD) used for distinguishing services having the same SST of the home public land mobile network (HPLMN) provided by the core network 530, or the like. The core network 530 may generate an indicator based on NASSI received from an external network, and may include the generated indicator in the paging message.

According to various embodiments, the core network 530 may include network slice selection assistance information in the paging message. According to another embodiment, the core network 530 may include only a part of the network slice selection assistance information (e.g., SST, mapped HPLMN SST, or PDU session ID) in the paging message.

According to various embodiments, in operation 920, the communication processor 720 may identify a service type using the indicator included in the paging message.

According to various embodiments, a service type may include the type of service selected from various services (e.g., eMBB, URLLC, mMTC, or V2X) which may be implemented as network slices.

According to various embodiments, in operation 930, the communication processor 720 may identify whether the identified service type corresponds to a predetermined service type.

According to various embodiments, the service type indicated by the indicator may include, for example, and without limitation, one of eMBB, mMTC, URLLC, or V2X as illustrated in Table 1, or may be a separate service type. The predetermined type may be one of URLLC or V2X, a service type designated by a manufacturer of the electronic device 700, or a service type designated by an operator of the first cellular communication operator or an operator of the second cellular communication. For example, the communication processor 720 may activate the application processor 710 in response to identifying that the identified service type is URLLC and the identified service type is identical to the predetermined service type (URLLC).

According to various embodiments, the indicator may include a protocol data unit session identification (PDU session ID). The communication processor 720 may identify the PDU ID, may refer to a PDU ID-service type mapping table stored in a memory (not illustrated) implemented in the communication processor 720, and may identify a service type corresponding to the PDU ID.

According to various embodiments, in operation 940, the communication processor 720 may activate the application processor 710 in response to identifying that the identified service type corresponds to the predetermined service type ("Yes" in operation 930).

According to various embodiments, the communication processor 720 may transmit an activation request signal associated with the application processor 710 to the application processor 710, in response to identifying that the identified service type corresponds to the predetermined type in operation 930 (YES). If the identified service type does not correspond to the predetermined type in operation 930 ("No" in operation 930), the communication processor goes to operation 950 described below.

According to various embodiments, the communication processor 720 may activate the application processor 710, and may transmit a drive frequency increase request signal to the application processor 710, in response to identifying that the service type included in the indicator is identical to the predetermined type. The application processor 710 may increase a drive frequency in response to reception of the drive frequency increase request signal. The application processor 710 operates at the increased drive frequency, and processes user data, and thus, may increase a user data processing rate and may decrease latency.

According to various embodiments, the communication processor 720 may transmit a request signal for decreasing a drive period of a timer used for identifying whether data is transmitted between the application processor 710 and the communication processor 720, to the application processor 710, in response to identifying that the service type included in the indicator is identical to the predetermined type. The application processor 710 may decrease a period for identifying data transmitted from the communication processor 720, and may increase a user data processing rate and decrease latency.

According to various embodiments, the communication processor 720 may maintain a display in the turned-off state, and may prepare a state that enables a low-latency service (e.g., URLLC), in response to identifying that the service type included in the indicator is identical to the predetermined type. According to an embodiment, the operation of preparing the state that enables the low-latency service (e.g., URLLC) may include an operation of adjusting the power state of a peripheral component interconnect express (PCIe) associated with the application processor 710. According to an embodiment, the operation of preparing the state that enables the low-latency service (e.g., URLLC) may include an operation of pre-loading an application associated with a low-latency service (e.g., URLLC) among applications installed in a terminal, in a memory, and allowing the associated application to be performed immediately after receiving related user data. According to an embodiment, the operation of preparing the state that enables the low-latency service (e.g., URLLC) may include an operation of scheduling the application processor 710 and adjusting a governor in order to perform an application associated with a low-latency service (e.g., URLLC) or restricting at least one other application, excluding the application associated with the low-latency service (e.g., URLLC), from being performed as a background.

According to various embodiments, in operation 950, the communication processor 720 may perform RRC connection in order to perform user data transmission and/or reception with the node 520.

According to various embodiments, the communication processor 720 may simultaneously perform RRC connection and activation of the application processor 710, irrespective of the order of operation 940 and operation 950.

According to various embodiments, a terminal may maintain a display in the turned-off state, while the communication processor 720 is performing radio resource connection (RRC) with the node 520 (at least some of operations 811 to 819 of FIG. 8), and if establishment of the RRC connection is complete or if actual user data for the service is transferred from the communication processor 720 to the application processor 710, the terminal may turn on the display.

According to various embodiments, in operation 960, the communication processor 720 may receive user data from the node 520, and may transmit the received user data to the application processor 710. The application processor 710 may process the user data.

Figure 10:
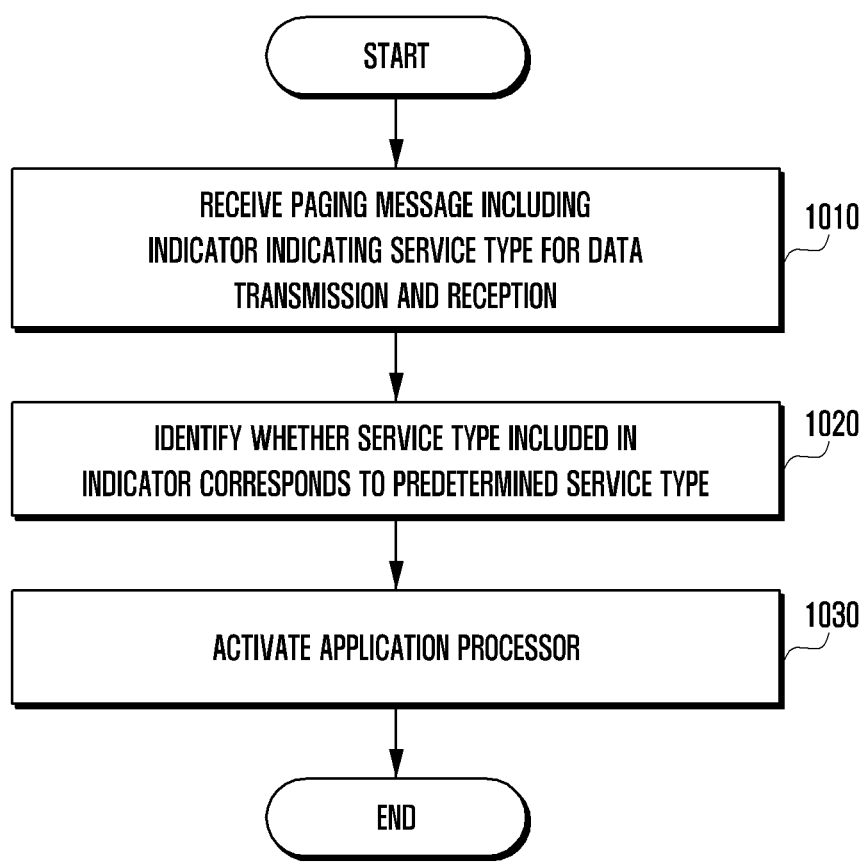
FIG. 10 is a flowchart illustrating an example method of operating an electronic device according to various embodiments.

FIG. 10 is a flowchart illustrating an example method 900 of operating an electronic device according to various embodiments.

According to various embodiments, in operation 1010, a communication processor (e.g., the communication processor 720 of FIG. 7) of an electronic device (e.g., the electronic device 510 of FIG. 5) may receive, from a node (e.g., the node 520 of FIG. 5), a paging message including an indicator indicating a service type for data transmission and/or reception.

According to various embodiments, a core network (e.g., the core network 530 of FIG. 5) connected to the node 520 may generate a paging message for requesting communication service connection from the electronic device 510, and may transmit the same to the electronic device 510 via the node 520.

According to various embodiments, the core network 530 may include an indicator indicating a communication service type in the paging message transmitted to the electronic device 510. The indicator may indicate information included in network slice selection assistance information (NASSI). The indicator may include, for example, and without limitation, any one of a network slice service type (SST), a network slice and service type (mapped HPLMN SST) of a HPLMN provided by the core network 530, a slice differentiator (mapped HPLMN SD) used for distinguishing services having the same SST of the home public land mobile network (HPLMN) provided by the core network 530, or the like. The core network 530 may generate an indicator based on NASSI received from an external network, and may include the generated indicator in the paging message.

According to various embodiments, the core network 530 may include network slice selection assistance information in the paging message. According to another embodiment, the core network 530 may include only a part of the network slice selection assistance information (e.g., SST, mapped HPLMN SST, or PDU session ID) in the paging message.

According to various embodiments, in operation 1020, the communication processor 720 may identify whether the service type included in the indicator corresponds to a predetermined service type.

According to various embodiments, a service type may include the type of service selected from various services (e.g., eMBB, URLLC, mMTC, or V2X) which may be implemented as network slices According to various embodiments, the service type indicated by the indicator may include, for example, and without limitation, one of eMBB, mMTC, URLLC, V2X, or the like, as illustrated in Table 1, or may be a separate service type. The predetermined type may be one of URLLC or V2X, a service type designated by a manufacturer of the electronic device 700, or a service type designated by an operator of the first cellular communication operator or an operator of the second cellular communication. For example, the communication processor 720 may activate the application processor 710 in response to identifying that the identified service type is URLLC and the identified service type is identical to the predetermined service type (URLLC).

According to various embodiments, the indicator may include a protocol data unit session identification (PDU session ID). The communication processor 720 may identify the PDU ID, may refer to a PDU ID-service type mapping table stored in a memory (not illustrated) implemented in the communication processor 720, and may identify a service type corresponding to the PDU ID.

According to various embodiments, in operation 1030, the communication processor 720 may activate the application processor 710 in response to identifying that the identified service type is identical to the predetermined service type.

According to various embodiments, the communication processor 720 may transmit an activation request signal associated with the application processor 710 to the application processor 710, in response to identifying that the identified service type is identical to the predetermined service type.

According to various embodiments, the communication processor 720 may activate the application processor 710, and may transmit a drive frequency increase request signal to the application processor 710, in response to identifying that the service type included in the indicator is identical to the predetermined type. The application processor 710 may increase a drive frequency in response to reception of the drive frequency increase request signal. The application processor 710 operates at the increased drive frequency, and processes user data, and thus, may increase a user data processing rate and may decrease latency.

According to various embodiments, the communication processor 720 may transmit a request signal for decreasing a drive period of a timer used for identifying whether data is transmitted between the application processor 710 and the communication processor 720, to the application processor 710, in response to identifying that the service type included in the indicator is identical to the predetermined type. The application processor 710 may decrease a period for identifying data transmitted from the communication processor 720, and may increase a user data processing rate and decrease latency.

According to various embodiments, the communication processor 720 may maintain a display in the turned-off state, and may prepare a state that enables a low-latency service (e.g., URLLC), in response to identifying that the service type included in the indicator is identical to the predetermined type. According to an embodiment, the operation of preparing the state that enables the low-latency service (e.g., URLLC) may include an operation of adjusting the power state of a peripheral component interconnect express (PCIe) associated with the application processor 710. According to an embodiment, the operation of preparing the state that enables the low-latency service (e.g., URLLC) may include an operation of pre-loading an application associated with a low-latency service (e.g., URLLC) among applications installed in a terminal, in a memory, and allowing the associated application to run immediately after receiving related user data. According to an embodiment, the operation of preparing the state that enables the low-latency service (e.g., URLLC) may include an operation of scheduling the application processor 710 and adjusting a governor in order to perform an application associated with a low-latency service (e.g., URLLC) or restricting at least one other application, excluding the application associated with the low-latency service (e.g., URLLC), from being performed as a background.

A method of operating an electronic device according to various example embodiments may include: receiving, by at least one communication processor, a paging message including an indicator indicating a service type for transmission and/or reception of a packet, from a master node configured to perform transmission and/or reception of a packet with the electronic device via cellular communication; and activating, by the at least one communication processor, an application processor based on performing a radio resource connection (RRC) connection with the master node, in response to identifying that the service type included in the indicator corresponds to a predetermined service type.

In the method of operating the electronic device according to various example embodiments, the indicator may include information included in network slice selection assistance information (NSSAI) included in the paging message.

In the method of operating the electronic device according to various example embodiments, the indicator may include a value included in a network slice and service type (slice/service type (SST)) provided by a core network connected to the master node.

In the method of operating the electronic device according to various example embodiments, the indicator may include a value included in a network slice and service type (SST) of a home public land mobile network (HPLMN) provided by a core network connected to the master node.

In the method of operating the electronic device according to various example embodiments, activating the application processor may include: identifying a PDU session identification (PDU session ID) included in the paging message; identifying a service type corresponding to the PDU session ID; and activating the application processor based on performing a radio resource connection (RRC) connection with the master node, in response to identifying that the service type corresponds to the predetermined service type.

The method of operating the electronic device according to various example embodiments may further include: transmitting, by the at least one communication processor, an interrupt signal to the application processor to activate the application processor; receiving, by the application processor, the interrupt signal transmitted from the at least one communication processor, based on the at least one communication processor and the master node performing the RRC connection; and performing, by the application processor, activation to process user packet data in response to reception of the interrupt signal.

The method of operating the electronic device according to various example embodiments may further include activating, by the at least one communication processor, the application processor, and transmitting a request signal for increasing a drive frequency of the application processor to the application processor.

The method of operating the electronic device according to various example embodiments may include: receiving, by the application processor in a state in which activation is complete, user packet data transmitted after RRC connection with the master node is complete, from the at least one communication processor; and processing, by the application processor, the user packet data by operating at the increased drive frequency.

In the method of operating the electronic device according to various example embodiments, the predetermined service type may include ultra-reliable and low latency communication (URLLC) or vehicle to everything (V2X).

The electronic device according to various embodiments may be one of various types of electronic devices. The electronic devices may include, for example, and without limitation, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code made by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by one of ordinary skill in the art that various changes in form and detail may be made without departing from the true spirit and full scope of the disclosure, including the appended claims and their equivalents.

What is claimed is:

1. An electronic device, comprising:
   at least one communication processor configured to perform transmission and/or reception of a packet with a master node via cellular communication; and
   an application processor,
   wherein the at least one communication processor is configured to control the electronic device to:
   receive, from the master node, a paging message including an indicator indicating a service type for transmission and/or reception of the packet; and
   activate the application processor based on performing a radio resource connection (RRC) connection with the master node, in response to identifying that the service type included in the indicator corresponds to a predetermined service type.

2. The electronic device of claim 1, wherein the indicator includes information included in network slice selection assistance information (NSSAI) included in the paging message.

3. The electronic device of claim 1, wherein the indicator includes a value included in a network slice and service type (slice/service type (SST)) provided by a core network connected to the master node.

4. The electronic device of claim 1, wherein the indicator includes a value included in a network slice and service type (SST) of a home public land mobile network (HPLMN) provided by a core network connected to the master node.

5. The electronic device of claim 1, wherein the at least one communication processor is configured to:
   identify a protocol data unit (PDU) session identification (PDU session ID) included in the paging message;
   identify a service type corresponding to the PDU session ID; and activate the application processor based on performing radio resource connection (RRC) connection with the master node, in response to identifying that the service type corresponds to the predetermined service type.

6. The electronic device of claim 1, wherein the at least one communication processor is configured to transmit an interrupt signal to the application processor to activate the application processor.

7. The electronic device of claim 6, wherein the application processor is configured to:
receive the interrupt signal transmitted from the at least one communication processor, based on the at least one communication processor performing the RRC connection with the master node; and
be activated to process user packet data in response to reception of the interrupt signal.

8. The electronic device of claim 1, wherein the at least one communication processor is configured to activate the application processor, and to transmit a request signal for increasing a drive frequency of the application processor to the application processor.

9. The electronic device of claim 8, wherein the application processor is configured to:
receive, from the at least one communication processor, user packet data transmitted after the RRC connection with the master node is complete, in a state in which activation of the application processor is complete; and
process the user packet data by operating at the increased drive frequency.

10. The electronic device of claim 1, wherein the predetermined service type includes ultra-reliable and low latency communication (URLLC) or vehicle to everything (V2X).

11. A method of operating an electronic device, comprising:
receiving, by at least one communication processor, a paging message including an indicator indicating a service type for transmission and/or reception of a packet, from a master node that performs transmission and/or reception of a packet with the electronic device via cellular communication; and
activating, by the at least one communication processor, an application processor based on performing a radio resource connection (RRC) connection with the master node, in response to identifying that the service type included in the indicator corresponds to a predetermined service type.

12. The method of claim 11, wherein the indicator includes information included in network slice selection assistance information (NSSAI) included in the paging message.

13. The method of claim 11, wherein the indicator includes a value included in a network slice and service type (slice/service type (SST)) provided by a core network connected to the master node.

14. The method of claim 11, wherein the indicator includes a value included in a network slice and service type (SST) of a home public land mobile network (HPLMN) provided by a core network connected to the master node.

15. The method of claim 11, wherein the activating the application processor comprises:
identifying a protocol data unit (PDU) session identification (PDU session ID) included in the paging message;
identifying a service type corresponding to the PDU session ID; and
activating the application processor based on performing radio resource connection (RRC) connection with the master node, in response to identifying that the service type corresponds to the predetermined service type.

16. The method of claim 11, further comprising:
transmitting, by the at least one communication processor, an interrupt signal to the application processor to activate the application processor;
receiving, by the application processor, the interrupt signal transmitted from the at least one communication processor, based on the at least one communication processor and the master node performing the RRC connection; and
performing, by the application processor, activation to process user packet data in response to reception of the interrupt signal.

17. The method of claim 11, further comprising:
activating, by the at least one communication processor, the application processor, and transmitting a request signal for increasing a drive frequency of the application processor to the application processor.

18. The method of claim 17, further comprising:
receiving, by the application processor in a state in which activation is complete, user packet data transmitted after RRC connection with the master node is complete, from the at least one communication processor; and
processing, by the application processor, the user packet data by operating at the increased drive frequency.

19. The method of claim 11, wherein the predetermined service type includes ultra-reliable and low latency communication (URLLC) or vehicle to everything (V2X).

* * * * *